(12) United States Patent
Aizawa et al.

(10) Patent No.: US 10,868,921 B2
(45) Date of Patent: Dec. 15, 2020

(54) INFORMATION PROCESSING DEVICE, IMAGING DEVICE, AND SYSTEM

(71) Applicants: Tatsuya Aizawa, Tokyo (JP); Nobuyoshi Hattori, Tokyo (JP)

(72) Inventors: Tatsuya Aizawa, Tokyo (JP); Nobuyoshi Hattori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 16/098,250

(22) PCT Filed: Jun. 2, 2017

(86) PCT No.: PCT/JP2017/020557
§ 371 (c)(1),
(2) Date: Nov. 1, 2018

(87) PCT Pub. No.: WO2018/012137
PCT Pub. Date: Jan. 18, 2018

(65) Prior Publication Data
US 2019/0149673 A1    May 16, 2019

(30) Foreign Application Priority Data
Jul. 13, 2016    (JP) .................. 2016-138559

(51) Int. Cl.
*H04N 5/77*    (2006.01)
*H04N 5/907*    (2006.01)
(Continued)

(52) U.S. Cl.
CPC ......... *H04N 1/00209* (2013.01); *G06F 16/51* (2019.01); *H04N 1/2112* (2013.01);
(Continued)

(58) Field of Classification Search
CPC .......... H04N 5/772; H04N 5/77; H04N 5/907; H04N 5/91; H04N 1/00209; H04N 1/2112;
(Continued)

(56) References Cited

U.S. PATENT DOCUMENTS

2009/0103129 A1    4/2009    Kurosawa
2010/0278396 A1*   11/2010   Mitsuhashi ........ G06K 9/00624
                                                           382/118
(Continued)

FOREIGN PATENT DOCUMENTS

EP    1734451       12/2006
JP    2001-061088   3/2001
(Continued)

OTHER PUBLICATIONS

International Search Report dated Jul. 4, 2017 in PCT/JP2017/020557 filed on Jun. 2, 2017.
(Continued)

*Primary Examiner* — Lin Ye
*Assistant Examiner* — John H Morehead, III
(74) *Attorney, Agent, or Firm* — IPUSA, PLLC

(57) ABSTRACT

An information processing device 30 configured to transmit a file stored in a memory medium 120 to a terminal. The information processing device includes: a specifying information creating unit 34 configured to create specifying information for specifying files stored in the memory medium, by using a file name and information about the memory medium; a transmitting unit 35 configured to transmit the specifying information to the terminal; and a file transmitting unit 37 configured to transmit to the terminal one of the files specified by the terminal in accordance with the specifying information.

8 Claims, 16 Drawing Sheets

(51) Int. Cl.
*H04N 5/91* (2006.01)
*H04N 1/00* (2006.01)
*H04N 21/2187* (2011.01)
*H04N 21/643* (2011.01)
*H04N 21/61* (2011.01)
*G06F 16/51* (2019.01)
*H04N 1/21* (2006.01)
*H04N 21/414* (2011.01)
*H04N 21/4223* (2011.01)
*H04N 9/82* (2006.01)
*H04L 29/08* (2006.01)

(52) U.S. Cl.
CPC .............. *H04N 1/2158* (2013.01); *H04N 5/77* (2013.01); *H04N 5/772* (2013.01); *H04N 5/907* (2013.01); *H04N 21/2187* (2013.01); *H04N 21/6131* (2013.01); *H04N 21/64322* (2013.01); *H04L 67/06* (2013.01); *H04N 5/91* (2013.01); *H04N 9/8205* (2013.01); *H04N 21/41407* (2013.01); *H04N 21/4223* (2013.01); *H04N 2201/0084* (2013.01)

(58) Field of Classification Search
CPC .............. H04N 1/2158; H04N 21/2187; H04N 21/64322; H04N 21/6131; H04N 21/41407; H04N 21/4223; H04N 21/8586; H04N 9/8205; H04L 67/06; G06F 16/51
See application file for complete search history.

(56) References Cited

U.S. PATENT DOCUMENTS

| | | | | |
|---|---|---|---|---|
| 2014/0055628 | A1* | 2/2014 | Yuasa | G06F 16/5866 |
| | | | | 348/207.1 |
| 2014/0104442 | A1* | 4/2014 | Naono | H04N 1/00127 |
| | | | | 348/207.1 |
| 2014/0320683 | A1 | 10/2014 | Kurosawa | |
| 2015/0253996 | A1* | 9/2015 | Nagashima | G06F 3/0605 |
| | | | | 711/162 |
| 2016/0219212 | A1* | 7/2016 | Shoji | H04N 5/23212 |
| 2016/0308950 | A1* | 10/2016 | Bouvrette | G06F 16/13 |

FOREIGN PATENT DOCUMENTS

| | | |
|---|---|---|
| JP | 2004-096582 | 3/2004 |
| JP | 2009-105502 | 5/2009 |
| JP | 2011-061543 | 3/2011 |
| JP | 2014-235692 | 12/2014 |
| JP | 2015-233183 | 12/2015 |
| JP | 2016-092464 | 5/2016 |

OTHER PUBLICATIONS

Extended European search report for 17827270.4 dated May 7, 2019.
Japanese Office Action for 2016-138559 dated Jun. 23, 2020.

* cited by examiner

[Fig. 1]
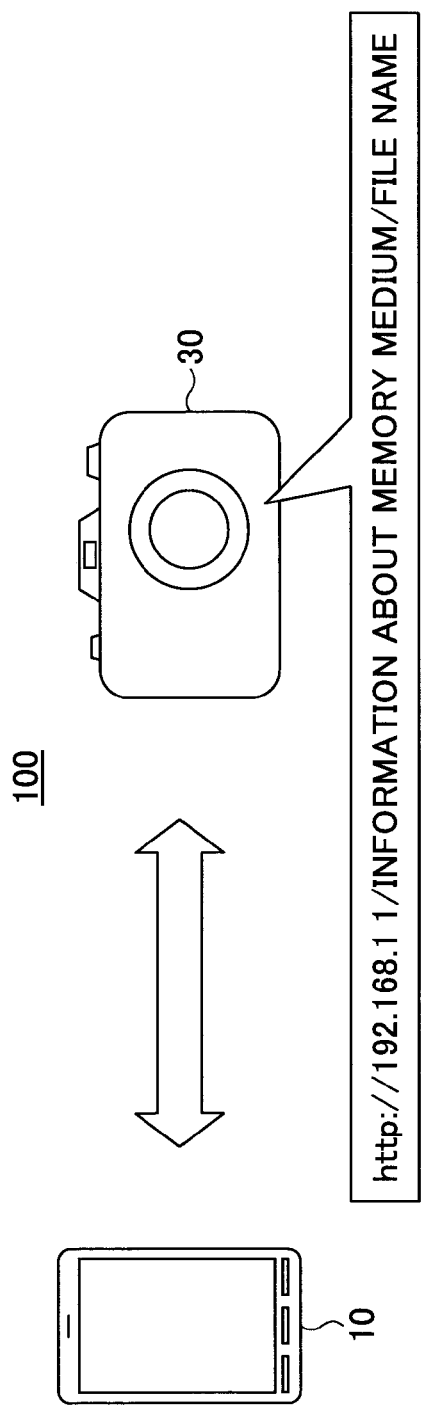

[Fig. 2A]
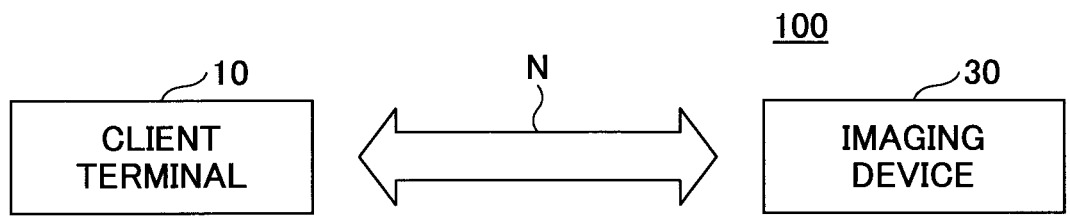
[Fig. 2B]
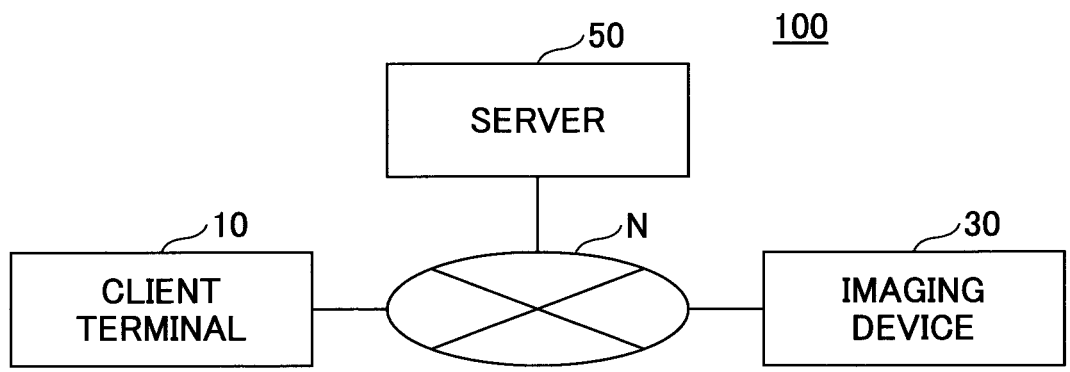

[Fig. 3]
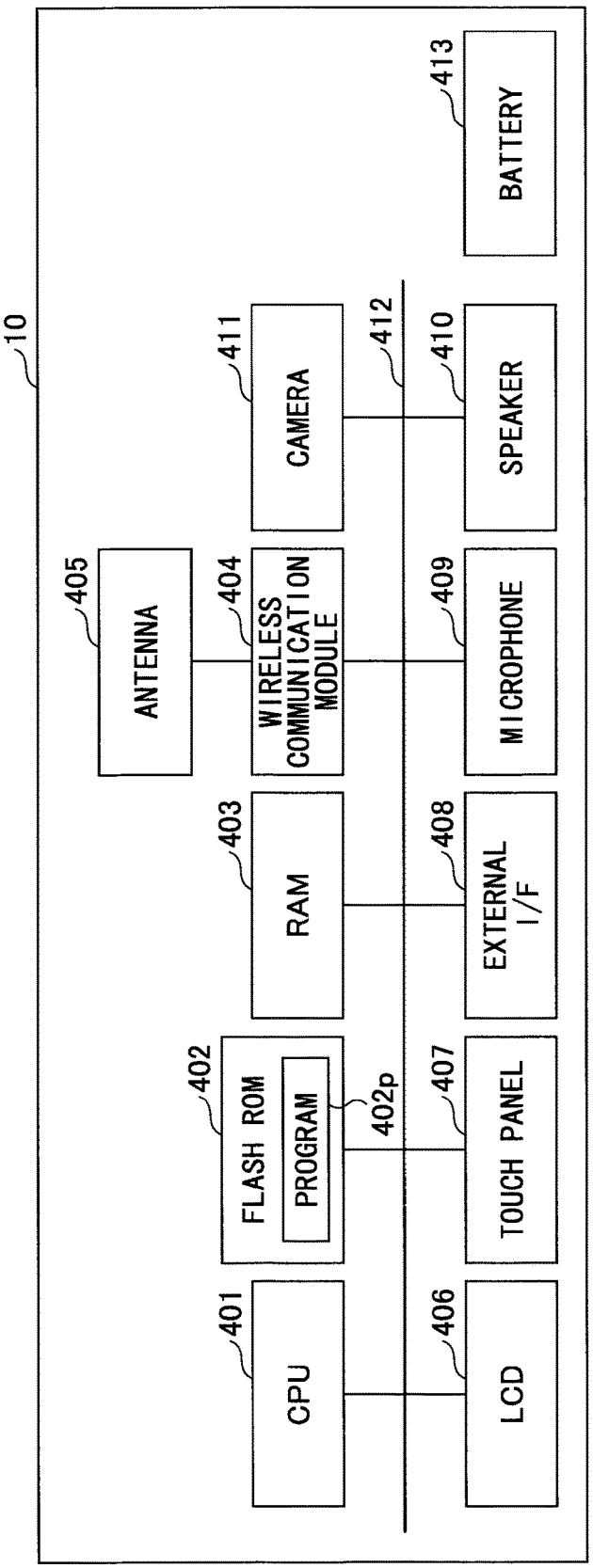

[Fig. 4]
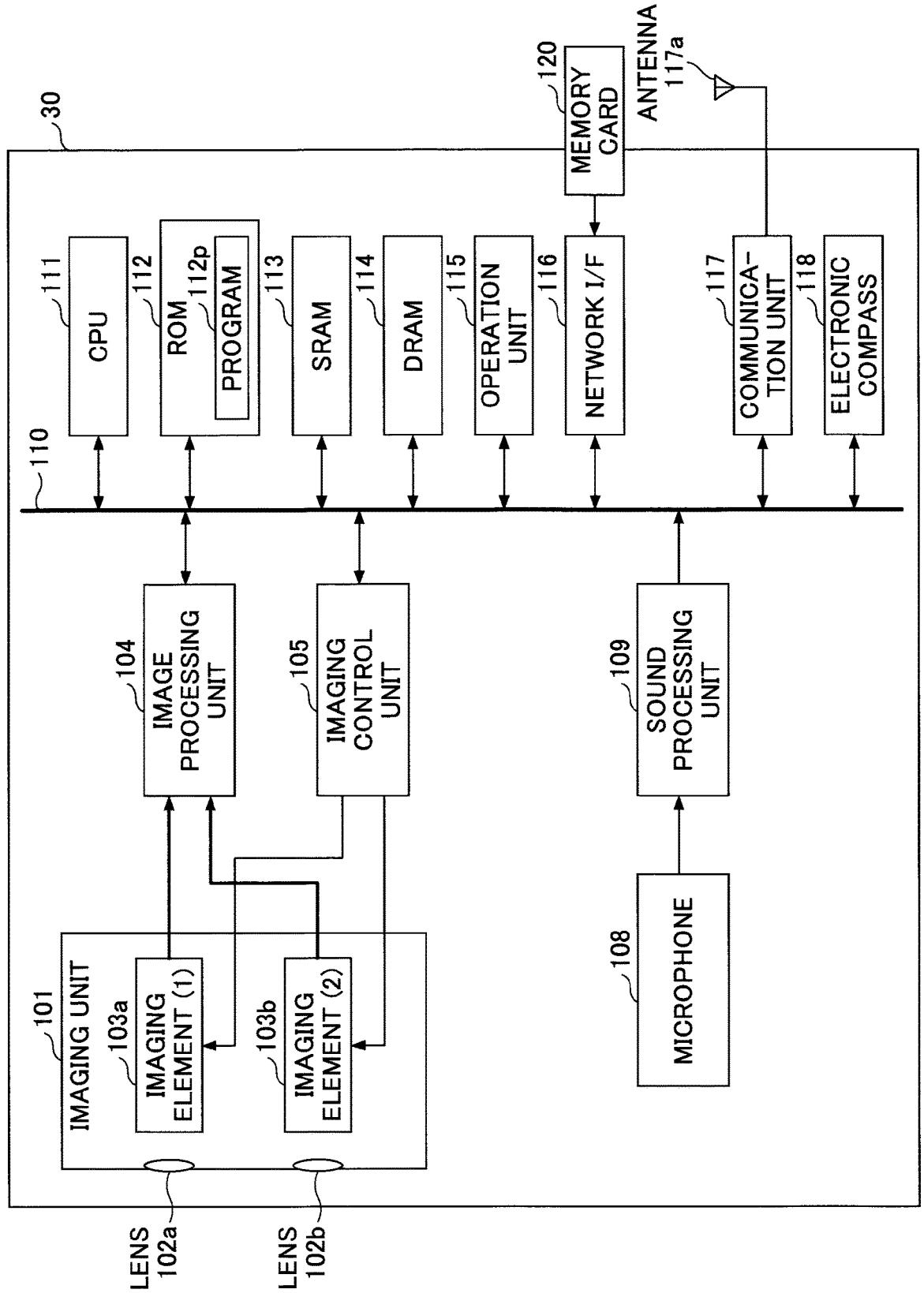

[Fig. 5]
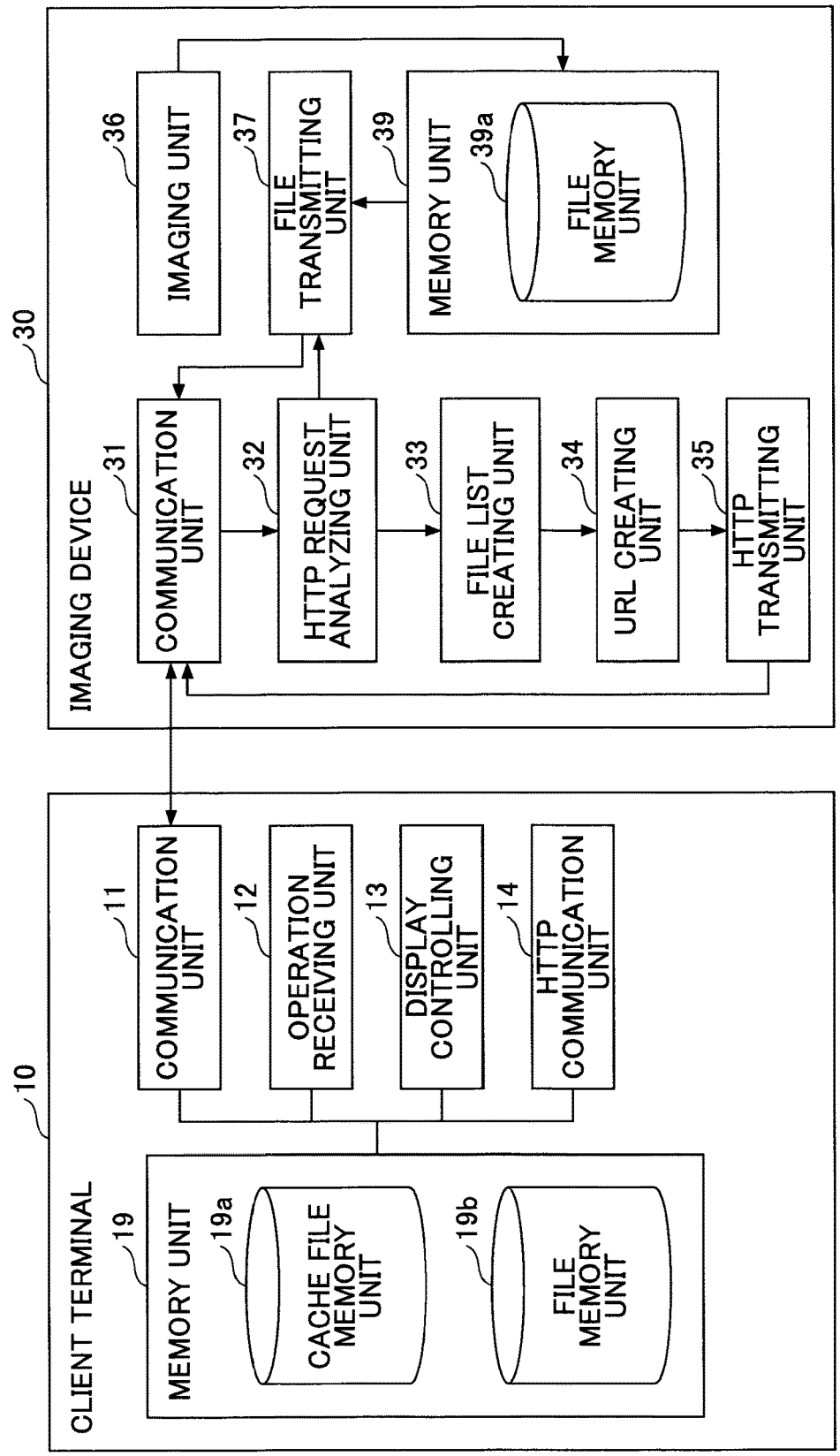

[Fig. 6]
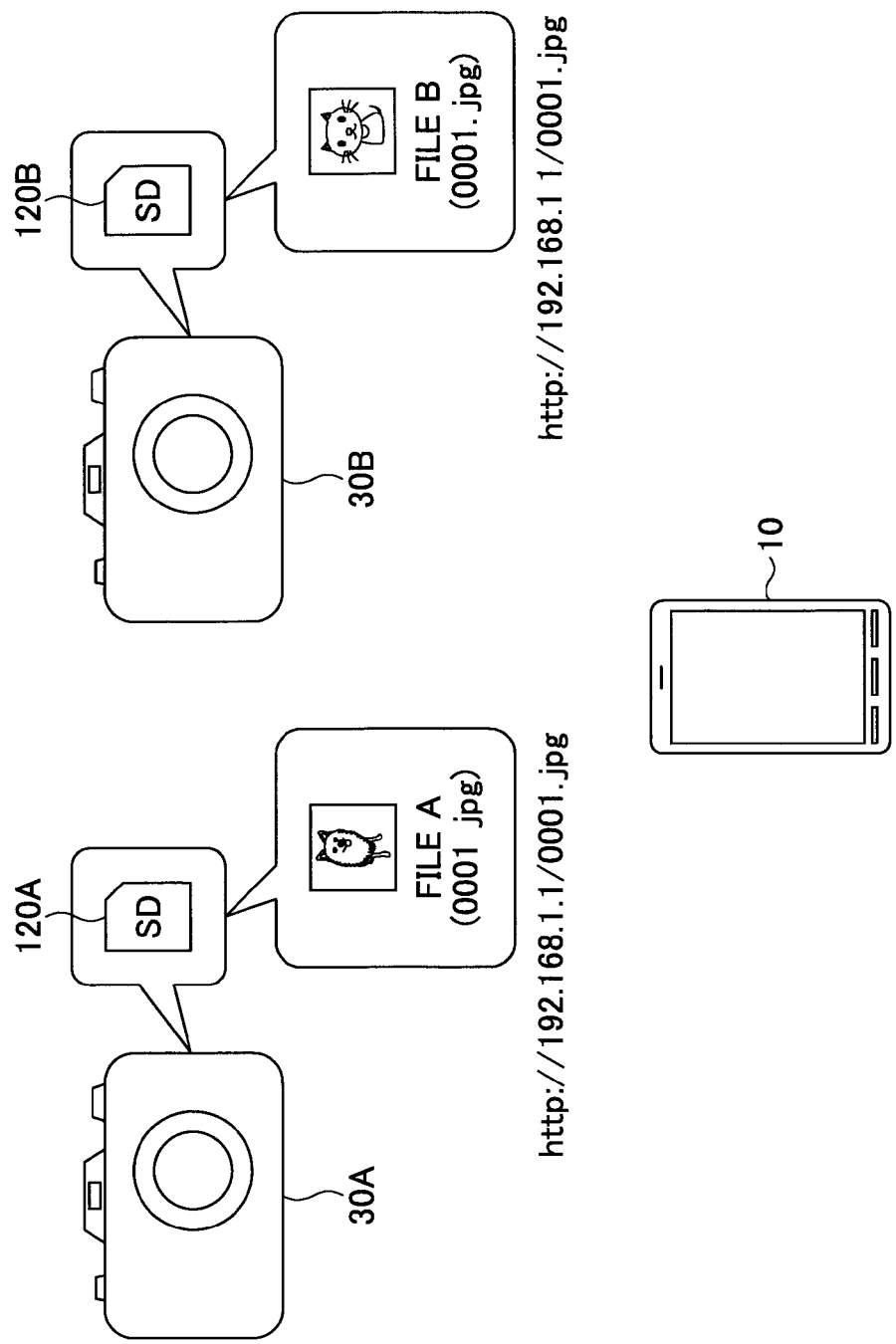

[Fig. 7]
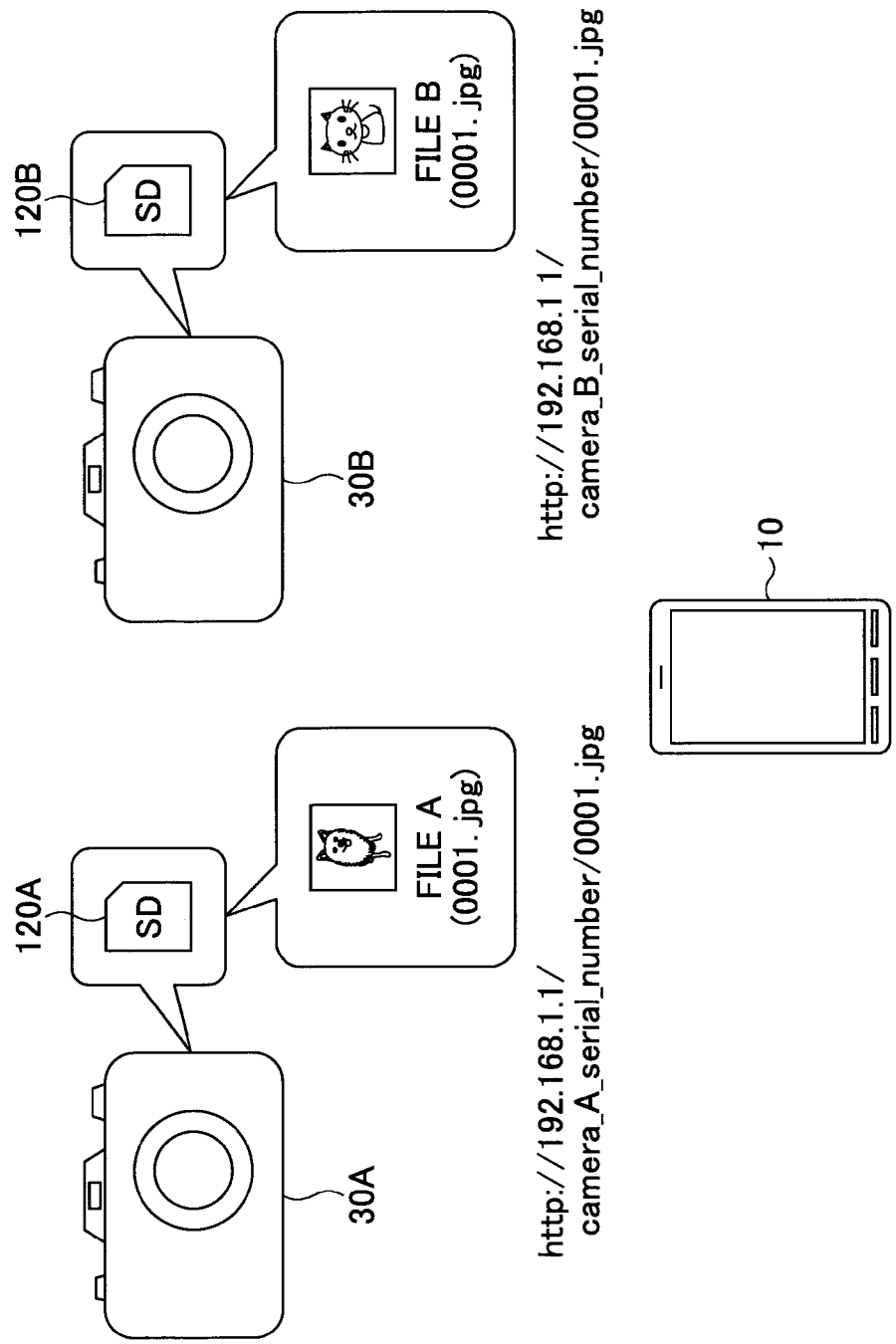

[Fig. 8]
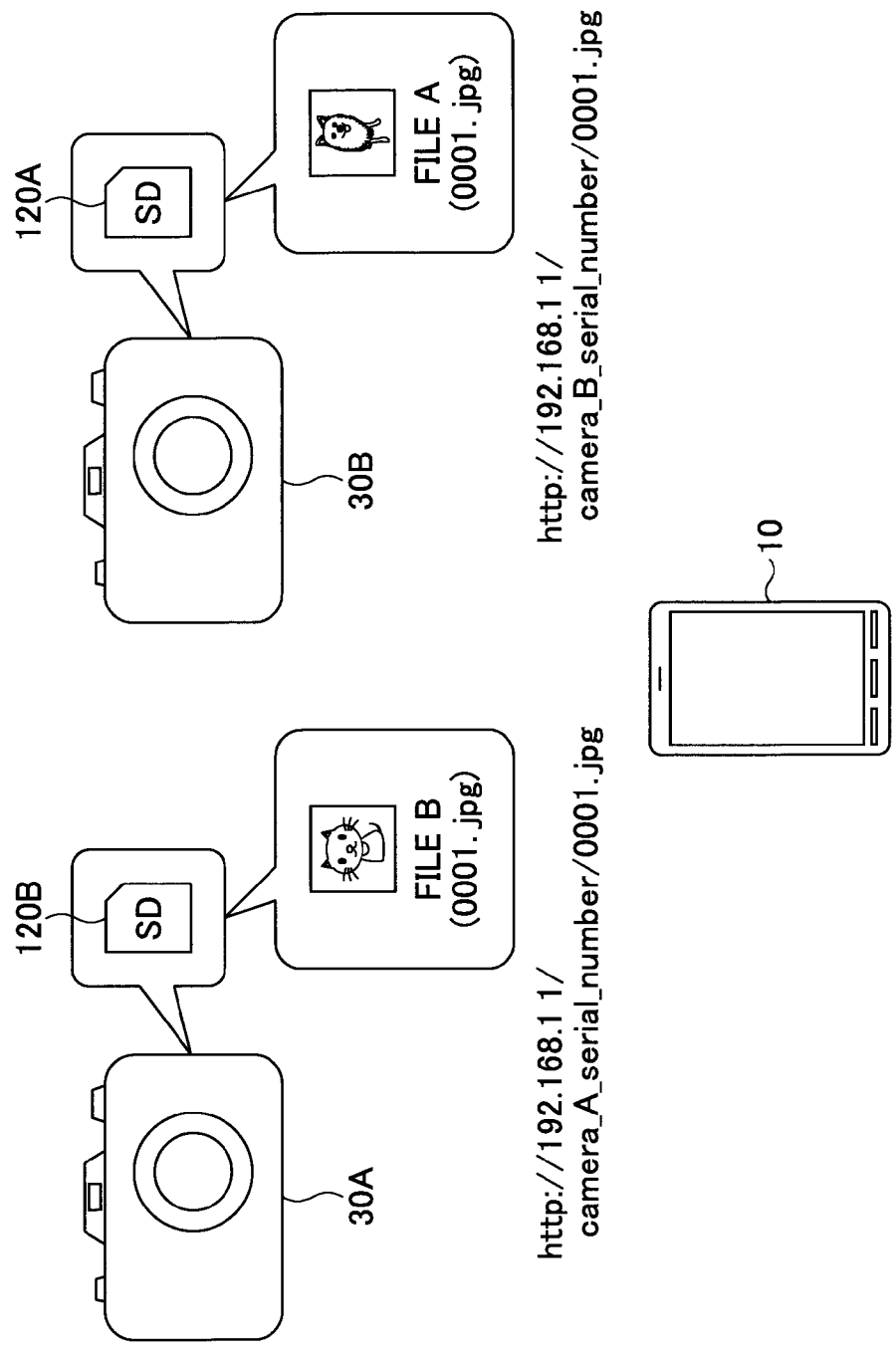

[Fig. 9]
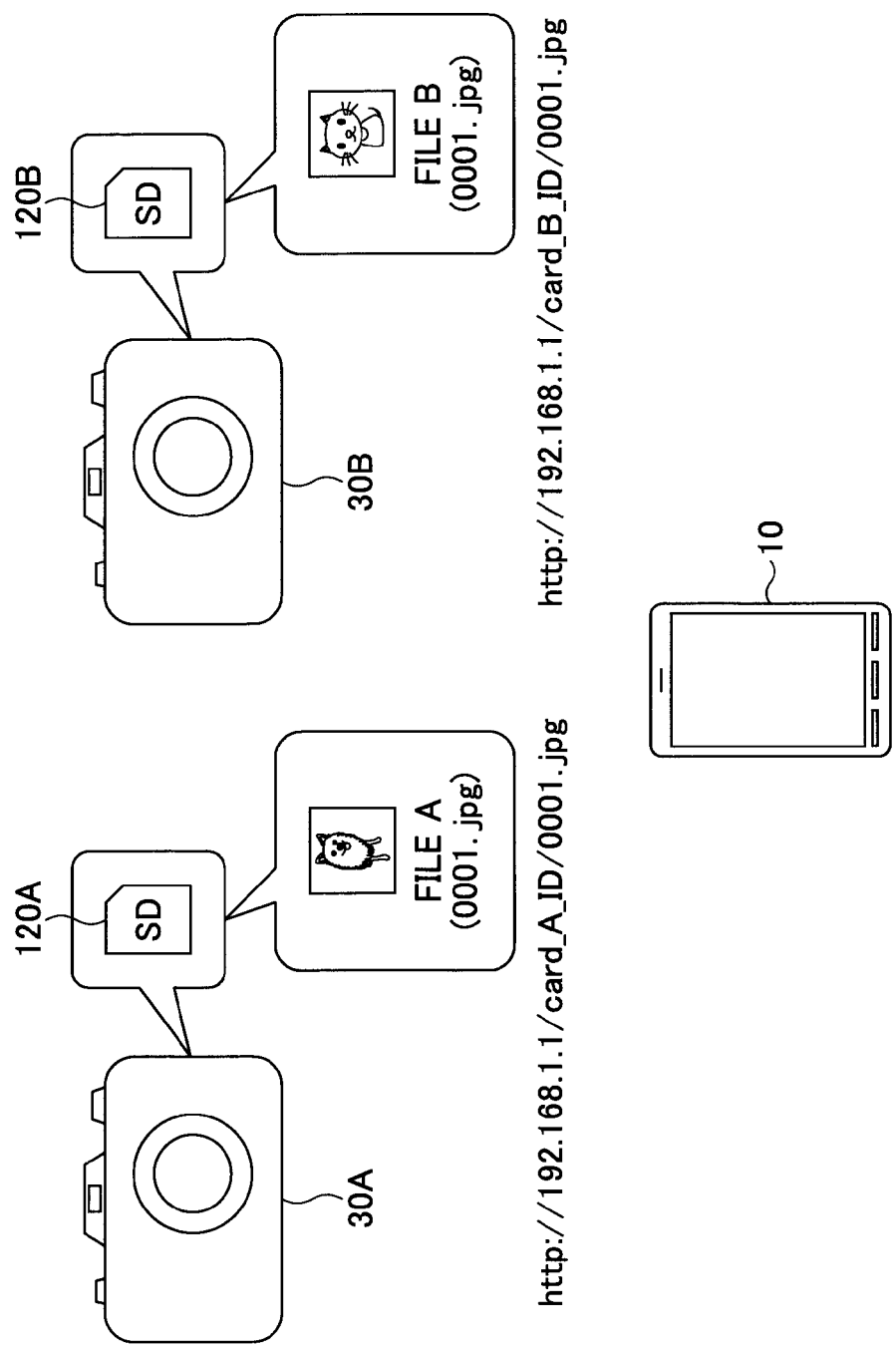

[Fig. 10]
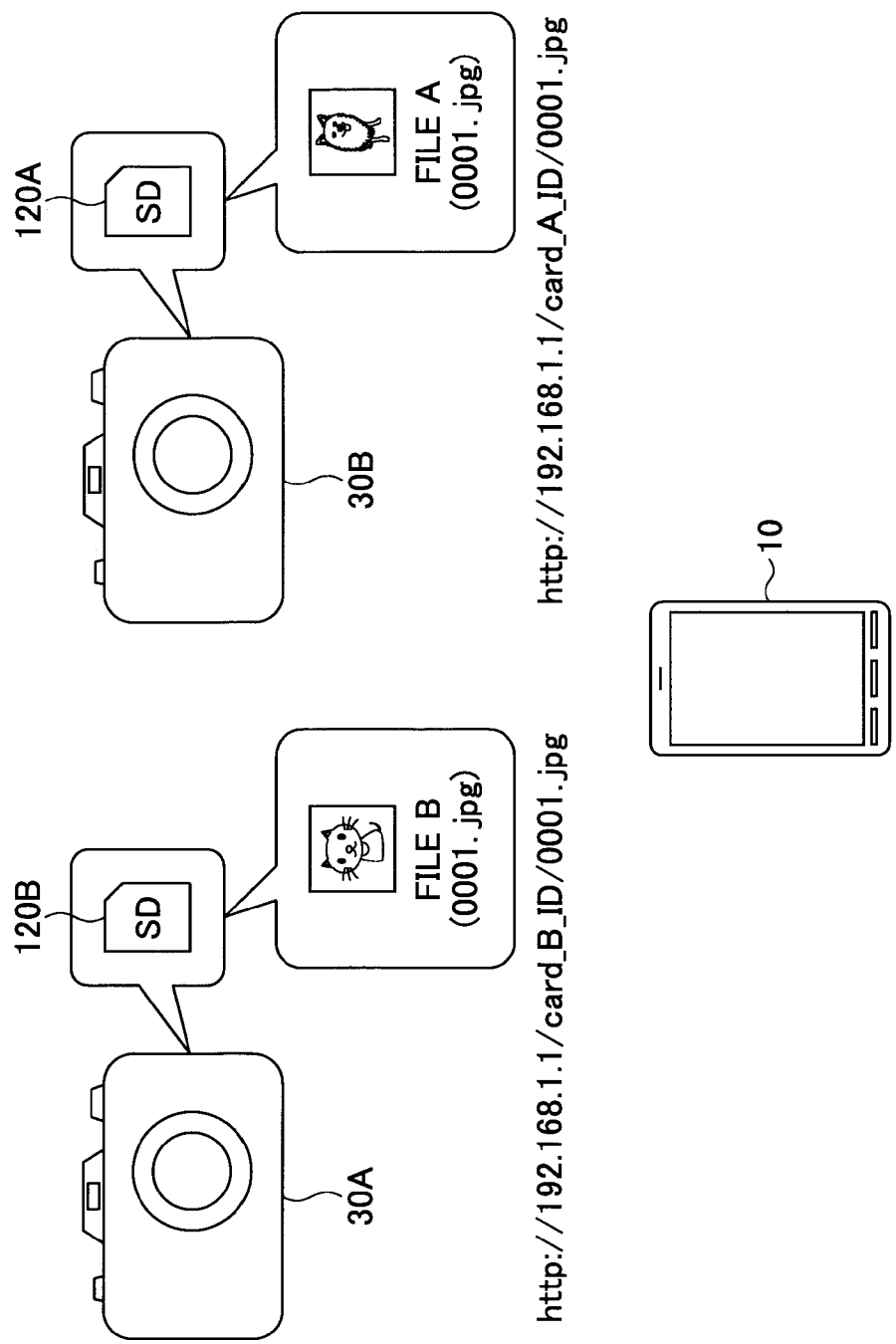

[Fig. 11]
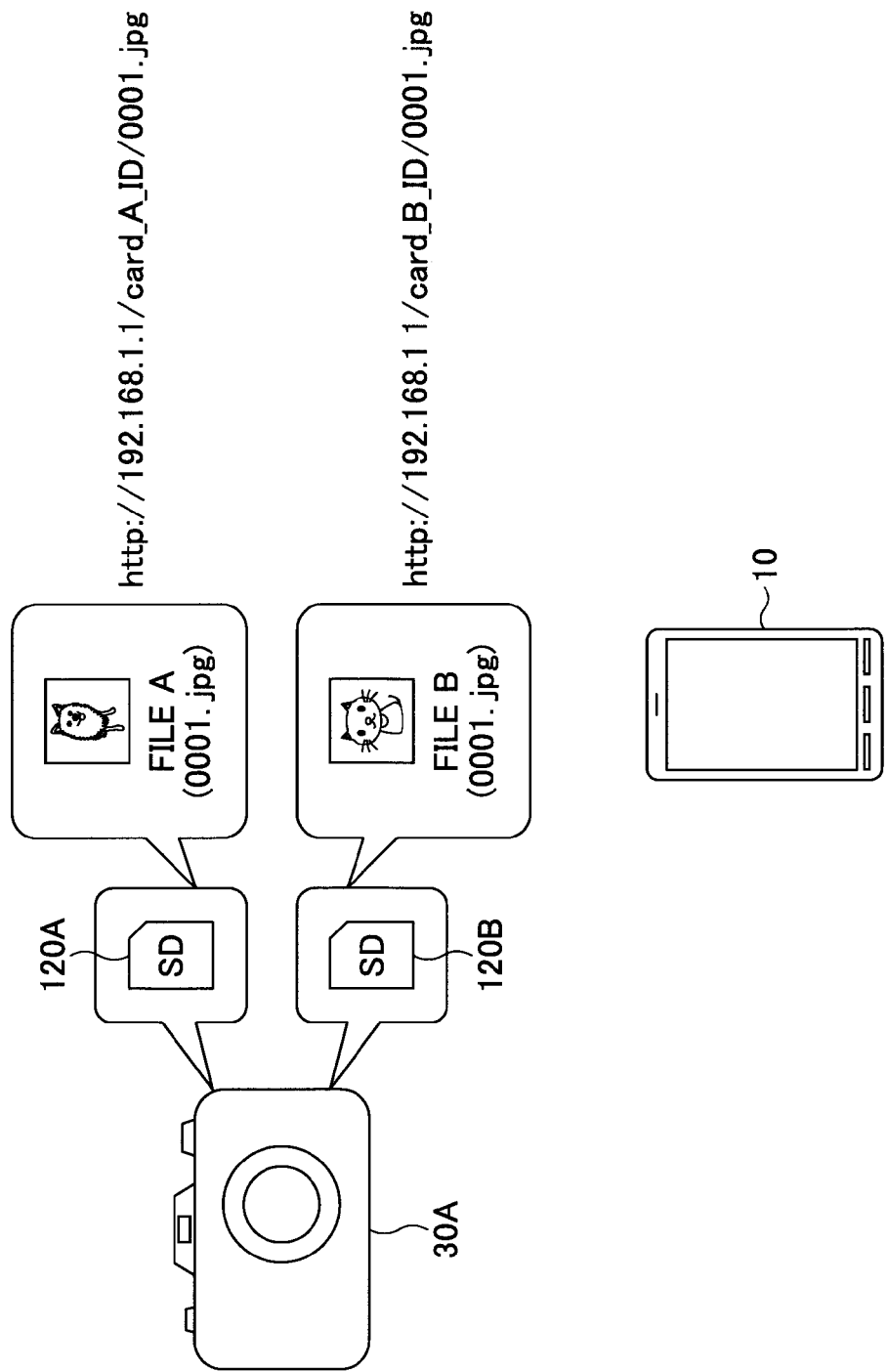

[Fig. 12]
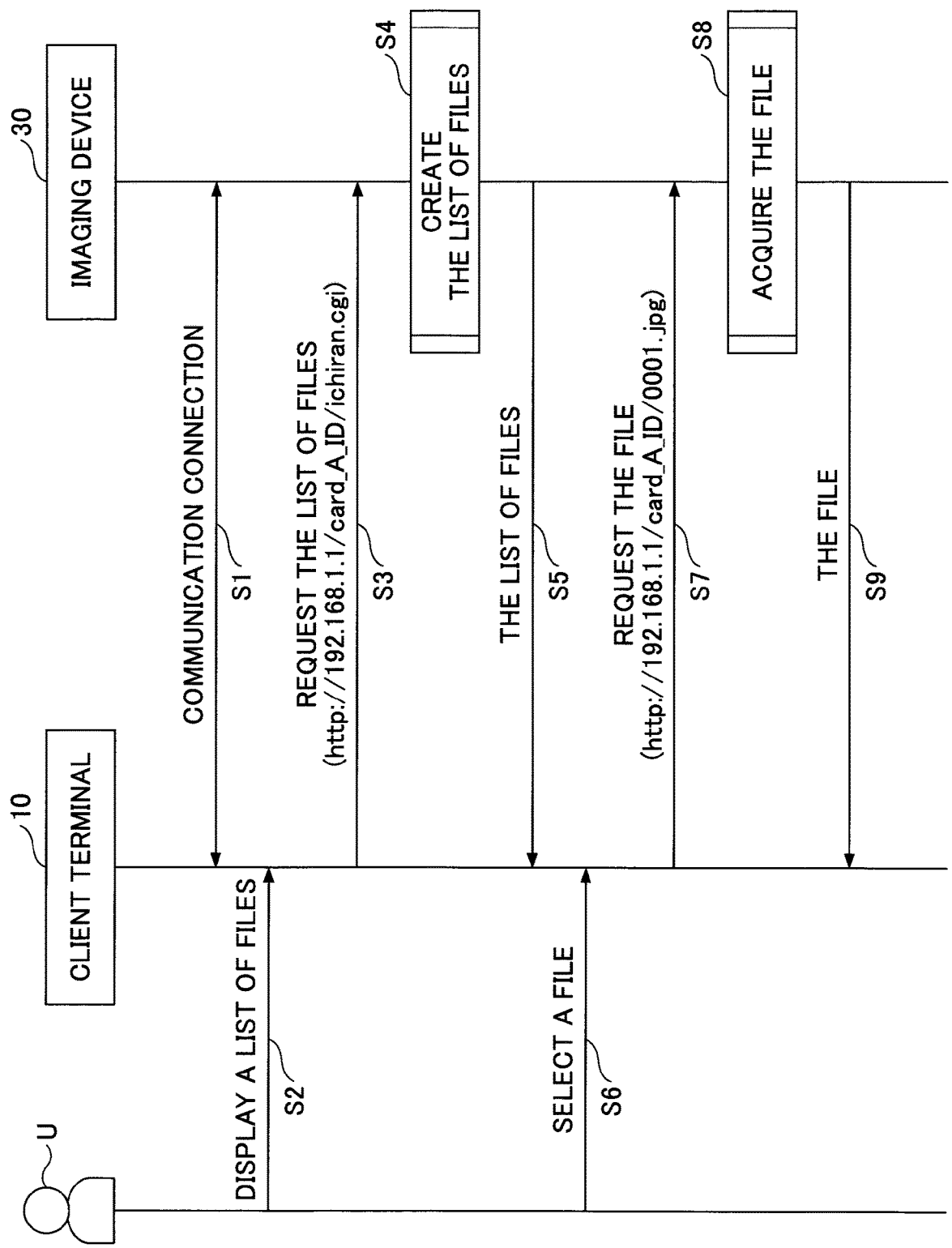

[Fig. 13]
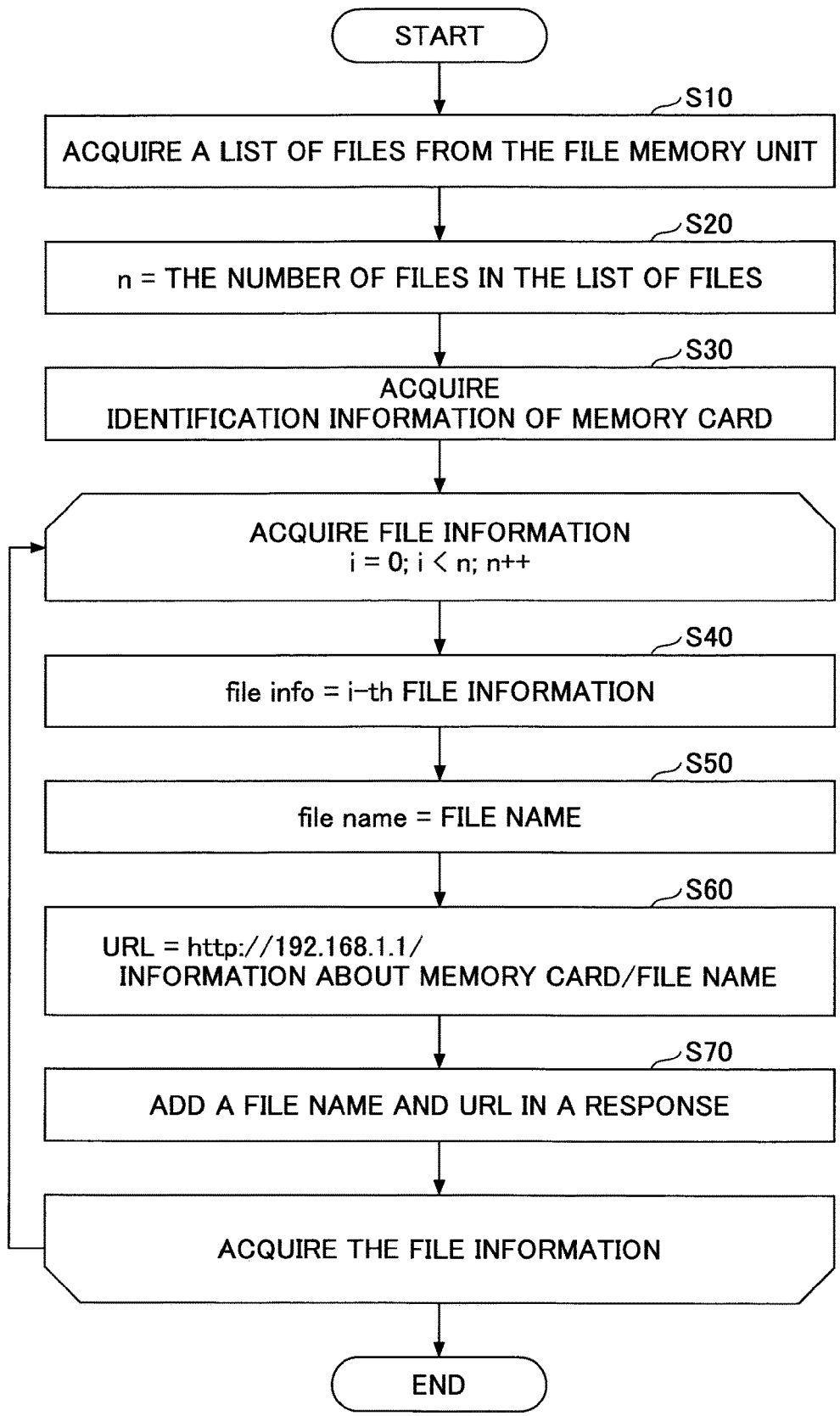

[Fig. 14]
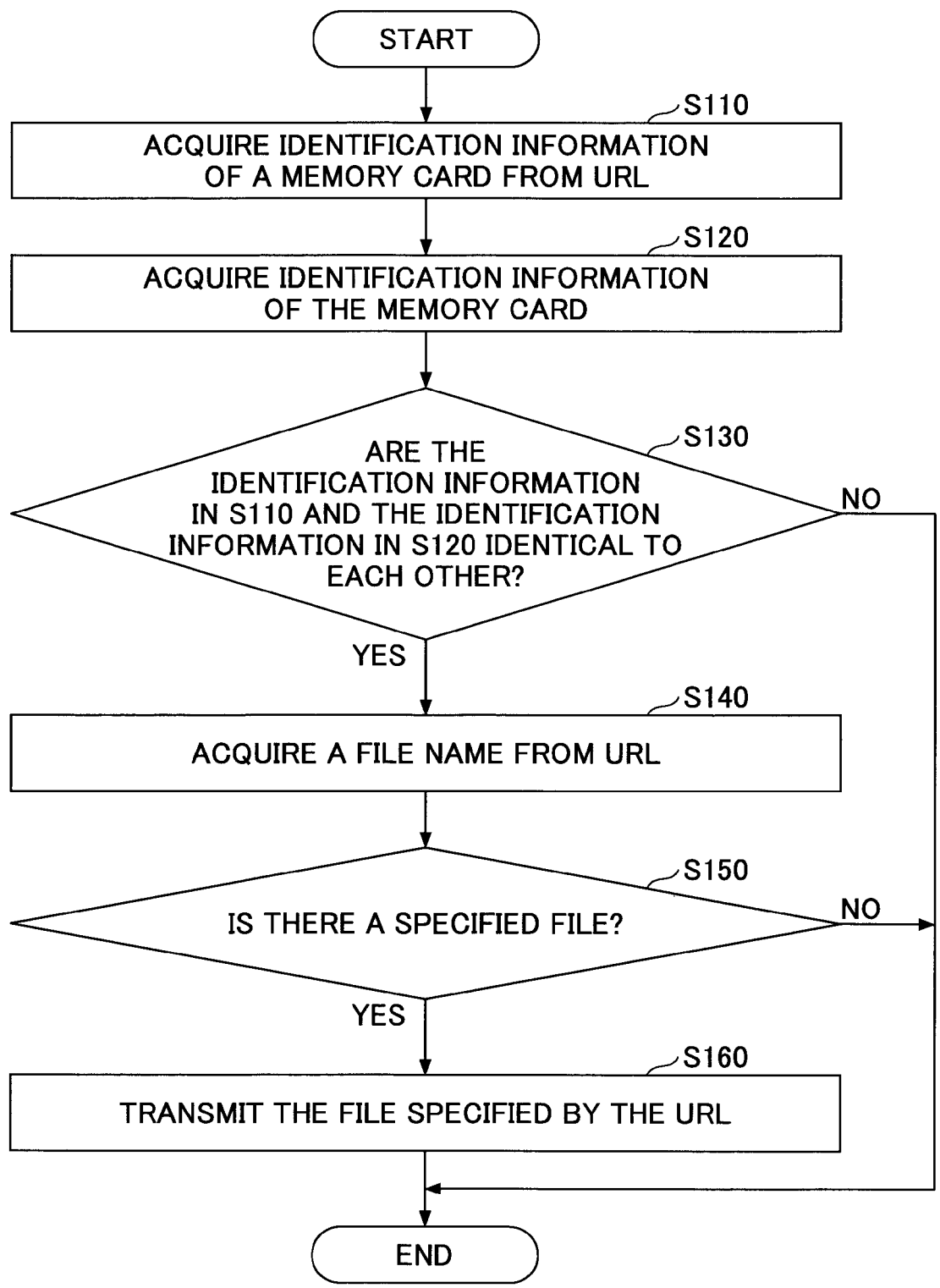

[Fig. 15A]
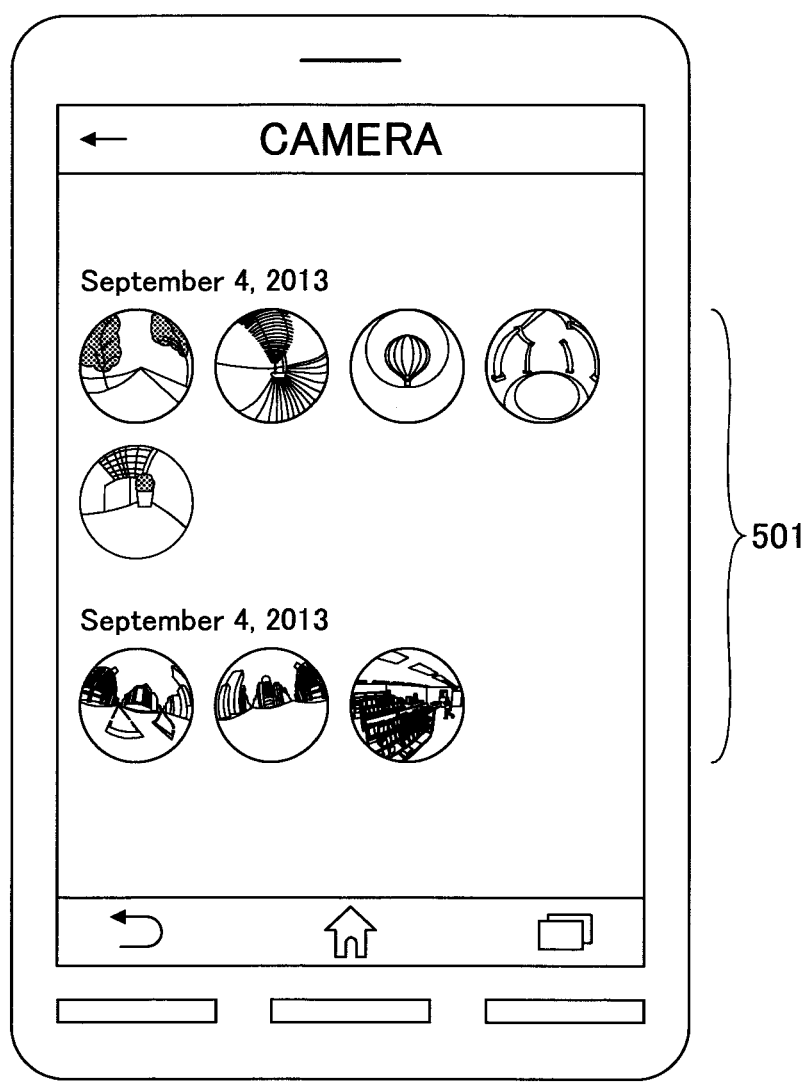

[Fig. 15B]
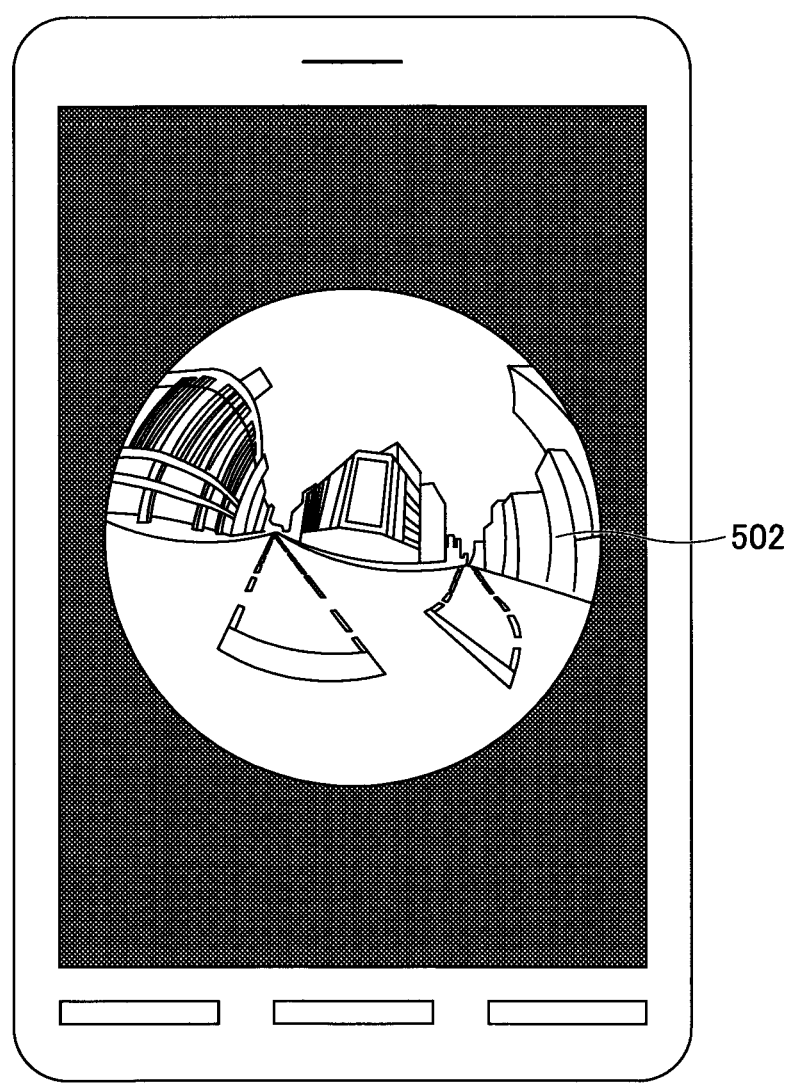

INFORMATION PROCESSING DEVICE, IMAGING DEVICE, AND SYSTEM

TECHNICAL FIELD

The present disclosure relates to an information processing device, an imaging device, and a system.

BACKGROUND ART

An imaging device stores files of captured still images and moving images in a memory medium. As is often the case, a user desires to transfer those files to a client terminal to view the captured still images or moving images on the client terminal. In this case, by detaching the memory medium from the imaging device and attaching the memory medium to the client terminal, the user is able to view the still images or moving images on the client terminal.

Alternatively, by causing a client terminal to communicate with the imaging device to receive a still or moving image via wired or wireless communication, the user is able to view the still or moving image on the client terminal (e.g., see PTL 1). PTL 1 discloses a technique for, when the client terminal receives a file from an imaging device via wireless communication, such as Wireless Fidelity (Wi-Fi) (registered trademark), shortening the time needed for transmitting image data by speeding up the communication system.

CITATION LIST

Patent Literature

[PTL 1] Japanese Laid-Open Patent Publication No. 2015-233183

SUMMARY OF INVENTION

Technical Problem

In the imaging device in the related art, however, the client terminal might encounter a difficulty in acquiring an appropriate file. As a specific example, in acquiring the file of the still or moving image from the imaging device, the client terminal sometimes specifies a URL of the imaging device. In a case where HTTP is used as a communication protocol, 192.168.1.1 is the IP address of the imaging device, "http://192.168.1.1/file name" is the URL of the imaging device.

Imaging devices of the same type, basically, have identical IP addresses. Hence, in a case where different files are identical in file name, such different files are also identical in URL. Here, it is assumed that there is a case where a user uses a client terminal to acquire a file from another imaging device. Such another imaging device stores another file, but file names automatically given are often identical between different imaging devices.

The client terminal acquires a file using a URL, as described above. Although the different files are included in the different imaging devices, the URLs including the file names are identical. This causes the client terminal to determine files that are in actuality different to be identical files. In this case, because of the identical URLs, the client terminal might exhibit a behavior of referring to a cache file in the client terminal without acquiring the file from the imaging device. Therefore, in the case where the client terminal specifies the file using the URL including the file name, the client terminal might not be able to acquire the file.

The present disclosure has been made in view of the above circumstances, and has an object to provide an information processing device capable of providing a file to a terminal.

Solution to Problem

According to an aspect of the present disclosure, an information processing device is configured to transmit a file stored in a memory medium to a terminal. The information processing device includes: a specifying information creating unit configured to create specifying information for specifying files stored in the memory medium, by using file names and information about the memory medium; a transmitting unit configured to transmit the specifying information to the terminal; and a file transmitting unit configured to transmit to the terminal one of the files specified by the terminal in accordance with the specifying information.

An information processing device capable of providing the file to the terminal is provided.

BRIEF DESCRIPTION OF DRAWINGS

FIG. 1 is a diagram illustrating a URL to be used when a client terminal acquires a still or moving image from an imaging device, as an example.

FIG. 2A is an example of a schematic system configuration diagram of an imaging system.

FIG. 2B is another example of the schematic system configuration diagram of the imaging system.

FIG. 3 is a hardware configuration diagram of the client terminal, as an example.

FIG. 4 is a hardware configuration diagram of the imaging device, as an example.

FIG. 5 illustrates functionalities of the client terminal and the imaging device included in the imaging system, as an example.

FIG. 6 illustrates URLs respectively created by imaging devices, as an example.

FIG. 7 illustrates URLs respectively including identification information of the imaging devices, as an example.

FIG. 8 illustrates URLs respectively including the identification information of the imaging devices, created in a case of the memory cards being switched with each other, as an example.

FIG. 9 illustrates URLs respectively including identification information of the memory cards, as an example.

FIG. 10 illustrates URLs respectively including the identification information of the memory cards, created in a case of the memory cards being switched, as an example.

FIG. 11 illustrates URLs created by the imaging device to which a plurality of memory cards are attached, as an example.

FIG. 12 is a sequence diagram illustrating an operation of the imaging system, as an example.

FIG. 13 is a flowchart of a procedure when the imaging device creates a list of files, as an example.

FIG. 14 is a flowchart of a procedure when the imaging device acquires a file to transmit the file to the client terminal, as an example.

FIG. 15A is a diagram illustrating an example of a screen displayed on the client terminal.

FIG. 15B is a diagram illustrating an example of the screen displayed on the client terminal.

DESCRIPTION OF EMBODIMENTS

In the following, embodiments of the present disclosure will be described with reference to the drawings.

<Outline of Imaging System>

FIG. 1 is a diagram illustrating a Uniform Resource Locator (URL) to be used when a client terminal 10 acquires a still or moving image from an imaging device 30, as an example. Note that the URL serves as information indicating a location of a resource, such as a file or a service accessible on a network, and a communication method.

The client terminal 10 and the imaging device 30 are coupled with each other via wireless communication, such as Wi-Fi (registered trademark). The imaging device 30 in the present embodiment is configured to set a URL used by the client terminal 10 to acquire a file, as follows.

URL="http://192.168.1.1/information about memory medium/file name".

As an example, the information about memory medium can be identification information of the memory medium. Therefore, when the memory medium is replaced with another one, the information about memory medium is also changed. For example, it is assumed that a file having a name "0001.jpg" is stored in a memory medium 1, and a file having a name "0001.jpg" is stored in a memory medium 2. In this case, "memory medium 1" and "memory medium 2" are the information about the memory media. The URLs are different, although the file names are identical.

Therefore, the client terminal determines that the file having the name "0001.jpg" in the memory medium 1 and the file having the name "0001.jpg" in the memory medium 2 are not identical, and is able to acquire (download) the files respectively from the imaging devices without using a cache file, for example.

<Regarding Terms>

The memory medium means a medium for storing files. The memory medium may be a built-in type, or may be detachable and portable.

Specifying information for specifying a file means information for specifying the file so that a client terminal acquires the file from an imaging device. In the present embodiment, a URL will be described as an example of the specifying information. Note that the URL may also be referred to as a Uniform Resource Identifier (URI).

Information about memory medium includes information relating to a device to which the memory medium is attached, information for indicating the memory medium, or information unique for a file stored in a memory medium. To be specific, the information about memory medium includes identification information of an imaging device, identification information of a memory medium, or a time when a file is created.

<System Configuration Example>

FIG. 2A and FIG. 2B are examples of schematic system configuration diagrams of an imaging system 100. In FIG. 2A, the imaging system 100 includes the client terminal 10 and the imaging device 30. The client terminal 10 and the imaging device 30 communicate with each other via a network N. The network N may be a wireless LAN, for example. On the network N, the client terminal 10 and the imaging device 30 can communicate with each other in an ad-hoc mode communicable on a one-to-one basis without going through an access point. Alternatively, the client terminal 10 and the imaging device 30 may communicate with each other on a wireless LAN called Wi-Fi Direct, which also enables one-to-one communication. In a case where an access point is provided, the client terminal 10 and the imaging device 30 may communicate with each other in an infrastructure mode. Other than the wireless LAN, communication over Bluetooth (registered trademark) is known, and the client terminal 10 and the imaging device 30 may communicate with each other over Bluetooth (registered trademark). The use of Personal Area Networking (PAN) Profile of Bluetooth (registered trademark) enables communication that is the same with Ethernet (registered trademark).

All or part of the network N may be configured by a cable, for example, a LAN cable. As is well known, also in a case of wired communication, communication using a URL is enabled.

The client terminal 10 may serve as an information processing device configured to acquire a file including a still or moving image from the imaging device 30. Acquire has almost the same meaning as download, receive, or have a response from the imaging device 30. To be specific, the client terminal 10 may be a Personal Computer (PC), a tablet terminal, a smartphone, a mobile telephone, a Personal Digital Assistant (PDA), a game machine, a car navigation terminal, or a wearable terminal, such as a wristwatch terminal or a sunglass-type terminal. The client terminal 10 is not limited to the above-described terminals, and may be any device capable of acquiring a file including a still or moving image.

The imaging device 30 may serve as an apparatus or a device configured to capture an image of a scene within an angle of view, and to create image data of a still or moving image. The imaging device 30 may have at least a function of imaging (e.g., camera) and a function of communicating with the client terminal 10. To be specific, the imaging device 30 may be a digital still camera, a digital video camera, a PC, a tablet terminal, a smartphone, a mobile telephone, a PDA, or a wearable terminal, such as a wristwatch terminal or a sunglass-type terminal. The camera may be externally attached. In a case where the camera is not externally attached, the imaging device 30 may have a function of the information processing device.

As an example of the imaging device 30 in the present embodiment, the imaging device 30 may capture an omnidirectional image. The omnidirectional image denotes an image that has been captured at a 360-degree angle of view around the imaging device 30 (horizontal direction=360 degrees in longitude, and vertical direction=360 degrees in latitude). The omnidirectional image is one type of what is called wide angle images, and an image with almost no blind angle is available. However, a method for creating a URL in the present embodiment is not applied only to the imaging device 30 configured to capture the omnidirectional image.

FIG. 2B illustrates another example of the imaging system 100. In the imaging system 100 illustrated in FIG. 2B, the client terminal 10, the imaging device 30, and a server 50 are coupled with one another in a communicable state through the network N. In one embodiment illustrated in FIG. 2B, the imaging device 30 transmits (uploads) a file including a still or moving image to the server 50. The client terminal 10 is coupled to the server 50 through an access point, and is able to acquire the file from the server 50.

In this case, the imaging device 30 transmits to the server 50 information about the memory medium together with the file. In this manner, the client terminal 10 may not necessarily acquire the file of the still or moving image from the imaging device 30, and may acquire the file in a client/server architecture. In such an architecture, the network N can be a communication line for 3G, LTE, or WiMAX, in some cases.

<Hardware Configuration>
<Hardware Configuration of Client Terminal>

FIG. 3 illustrates a hardware configuration diagram of the client terminal 10, as an example. The illustrated client terminal 10 includes: a CPU 401; a flash ROM 402; a RAM 403; a wireless communication module 404; an antenna 405; an LCD 406; a touch panel 407; an external OF 408; a microphone 409; a speaker 410; and a camera 411, which are coupled to a bus 412 so as to be capable of communicating data. The client terminal 10 further includes a battery 413 to supply the power to each of the above devices.

The CPU 401 is configured to control the client terminal 10 as a whole by operation processing with various types of data, in accordance with a program 402p stored in the flash ROM 402. The flash ROM 402 stores the program 402p for controlling the client terminal 10 as a whole, and also functions as storage for storing various types of data. The program 402p may include an application or browser software.

The RAM 403 is used as a work memory of the CPU 401. The program 402p stored in the flash ROM 402 is read into the RAM 403, and is run by the CPU 401. The wireless communication module 404 controls voice communication and data communication by way of a cellular telephone network. The wireless communication module 404 also controls communication on a wireless LAN or Bluetooth (registered trademark) Low Energy (BLE) (hereinafter, in some cases, registered trademark for Bluetooth will be omitted).

An LCD 406 displays icons for operating the client terminal 10 and various types of data. A touch panel 407 overlays and adheres to the LCD 406, and is configured to detect a position touched by finger.

An external OF 408 may be a USB interface, for example, and is provided for connecting an external device. A microphone 409 is configured to perform Analog/Digital (A/D) conversion on a voice signal that has been input. A speaker 410 performs D/A conversion on sound data to output an audible signal. A camera 411 performs A/D conversion on an image signal that has been output from an imaging element.

<Hardware Configuration of Imaging Device>

FIG. 4 is a hardware configuration diagram of the imaging device 30, as an example.

In the following description, the imaging device 30 includes two imaging elements, but the imaging device 30 may include three or more imaging elements. In addition, in FIG. 4, although the imaging device 30 is illustrated as a device for capturing an omnidirectional image, the imaging device may include only one imaging element. Further, an imaging element may not necessarily be provided for capturing a wide angle image.

That is to say, the imaging device 30 in the present embodiment may be an imaging device configured to capture an image at an ordinary angle of view.

The imaging device 30 may not necessarily be provided especially for capturing the omnidirectional image. By additionally attaching an omnidirectional imaging unit to an ordinary digital camera or smartphone, the substantially same function as the imaging device 30 may be achieved.

As illustrated in FIG. 4, the imaging device 30 includes: an imaging unit 101; an image processing unit 104; an imaging control unit 105; a microphone 108; a sound processing unit 109; a Central Processing Unit (CPU) 111; a Read Only Memory (ROM) 112; a Static Random Access Memory (SRAM) 113; a Dynamic Random Access Memory (DRAM) 114; and an operation unit 115; a network I/F 116; a communication unit 117; and an antenna 117a.

In the above-described components, the imaging unit 101 includes: wide-angle lenses (also known as fish-eye lenses) 102a and 102b, each of which has a 180-degree or more angle of view to form a hemispheric image; and two imaging elements 103a and 103b respectively corresponding to the wide-angle lenses 102a and 102b. Each of the imaging elements 103a and 103b may include: an image sensor, such as a Complementary Metal Oxide Semiconductor (CMOS) sensor or a Charge Coupled Device (CCD) sensor, configured to convert an optical image captured by the fish-eye lens into image data to output the image data; a timing generator circuit configured to generate horizontal or vertical synchronization signals or pixel clocks of the image sensor; and a register group in which various commands and parameters needed for operations of the imaging element are set.

The imaging elements 103a and 103b of the imaging unit 101 are each coupled with the image processing unit 104 through a parallel I/F bus. The imaging elements 103a and 103b of the imaging unit 101 are each coupled with the imaging control unit 105 through a serial I/F bus (such as an I2C bus). The image processing unit 104 and the imaging control unit 105 are coupled with the CPU 111 via a bus 110. Further, the bus 110 is coupled with the ROM 112, the SRAM 113, the DRAM 114, the operation unit 115, the network I/F 116, the communication unit 117, and an electronic compass 118.

The image processing unit 104 loads pieces of image data output from the imaging elements 103a and 103b through the parallel I/F buses. After performing given processing on the pieces of image data, the image processing unit 104 performs synthesis processing on the pieces of image data to create Mercator image data.

The imaging control unit 105 is configured to set, for example, commands in register groups in the imaging elements 103a and 103b via the I2C buses, with the imaging control unit 105 serving as a master device and the imaging elements 103a and 103b serving as slave devices. The imaging control unit 105 is configured to acquire necessary commands from the CPU 111. The imaging control unit 105 is also configured to load, for example, status data of the imaging elements 103a and 103b via the I2C buses in the same manner, and to send the status data to the CPU 111.

The imaging control unit 105 is configured to instruct the imaging elements 103a and 103b to output the image data, at a timing when a shutter button of the operation unit 115 is pressed. Some imaging devices 30 may have a function corresponding to a preview display function or a video display, on a display. In such imaging devices 30, the imaging elements 103a and 103b are configured to continuously output the image data at a given frame rate (the number of frames/minute).

The imaging control unit 105 may also function as a synchronization control unit configured to coordinate with the CPU 111 to synchronize output timings of the image data from the imaging elements 103a and 103b, as will be described. Note that in the present embodiment, the imaging device 30 does not include a display unit, but may also include a display unit.

The microphone 108 is configured to convert sounds into sound (signal) data. The sound processing unit 109 is configured to load the sound data output from the microphone 108 through an I/F bus, and to perform given processing on the sound data.

The CPU 111 is configured to control the operations of the imaging device 30 as a whole, and to perform necessary processing. The ROM 112 stores various types of programs 112p for the CPU 111. The SRAM 113 and the DRAM 114 serve as work memories, and store the programs 112p to be run by the CPU 111 and data that is being processed, for example. In particular, the DRAM 114 is configured to store the image data that is being processed by the image processing unit 104 and the Mercator image data that has been processed.

The operation unit 115 is a generic term that includes various operation buttons, a power on/off switch, a shutter button, and a touch panel serving as a display as well as an operational function. By operating the operation buttons, a user inputs various imaging modes or imaging conditions.

The network I/F 116 is a generic term that includes an external memory card 120 such as an SD card, and an interface circuit (such as a USB I/F) with a personal computer. The memory card 120 is not limited to the SD card, and may be a USB memory, a Memory Stick (registered trademark), a CompactFlash (registered trademark) memory card, an external hard disk, or an external Solid State Drive (SSD).

The network I/F 116 can be any interface for the network N regardless of wired or wireless communication. The Mercator image data stored in the DRAM 114 may be stored in the external memory card 120 through the network I/F 116, or may be transmitted to an external device such as the client terminal 10 through the network I/F 116, as appropriate.

The communication unit 117 communicates with an external device such as a client terminal via the antenna 117a provided at the imaging device 30, in accordance with a wireless networking technology, such as Wi-Fi (registered trademark), Near field Communication (NFC), or Long Term Evolution (LTE). The communication unit 117 also enables the Mercator image data to be transmitted to an external device such as the client terminal 10.

The electronic compass 118 is configured to calculate an orientation and an inclination (Roll rotation angle) of the imaging device 30 from terrestrial magnetism, and to output orientation and inclination information. The orientation and inclination information is one example of related information (metadata) according to Exif, and is utilized for image processing such as image correction of a captured image. Note that the related information can be respective pieces of data, such as a captured time and date of an image and a data volume of the image data.

instructions from the CPU 401, in accordance with the program 402p developed on the RAM 403 from the flash ROM 402 illustrated in FIG. 3. The program 402p may be an application or browser software special for the imaging device 30. The program 402p can be downloaded from a program delivering server or can be delivered in a portable memory medium in which the program 402p is stored.

The client terminal 10 further includes a memory unit 19 enabled by the flash ROM 402 or the RAM 403 illustrated in FIG. 3. In the memory unit 19, a cache file memory unit 19a and a file memory unit 19b are implemented.

TABLE 1

| ID | File Name | Size [Mbyte] | Created Time and Date | Type |
|---|---|---|---|---|
| 1 | 0001.jpg | 1.2 | July 1, 2016 12:34 | JPEG |
| 2 | 0002.jpg | 1.5 | July 2, 2016 15:21 | JPEG |
| 3 | 0003.jpg | 2.2 | July 3, 2016 10:11 | JPEG |
| 4 | 0004.jpg | 1.8 | July 4, 2016 14:12 | JPEG |

Table 1 schematically illustrates files stored in the file memory unit 19b. The files are typically managed by a file system provided by an OS of the client terminal 10. In such a file system, a plurality of folders (or directories) are managed in a hierarchical architecture. A file of a still or moving image is stored in one of the plurality of folders, which has been determined by a user's instruction or by an application.

Table 1 is simply a table schematically illustrating the stored files, and may include several items, for example, an ID, a file name, a size, a created time and date, and a type. The ID is an identifier allowing the client terminal 10 to identify each file. The file name is a name allowing a user to determine each file. The size is a file size represented in bytes. The created time and date is a time and date when each file is created. The type represents what type of data each file includes.

Whether presences of identical file names are permitted may differ depending on the OS. However, in Table 1, since the ID is used for identifying each file, identical file names can be included in the same folder. In storing a file in a folder, the OS gives a unique ID that does not overlap. In addition, in storing a file having an identical name in the same folder, some OSs add a numerical number in parentheses to a file name.

TABLE 2

| ID | File Name | Size [Mbyte] | Created Time and Date | URL | Type |
|---|---|---|---|---|---|
| 1 | 0001.jpg | 1.2 | July 1, 2016 12:34 | http://192.168.1.1/card_A_ID/ | JPEG |
| 2 | 0002.jpg | 1.5 | July 2, 2016 15:21 | http://192.168.1.1/card_A_ID/ | JPEG |
| 3 | 0003.jpg | 2.2 | July 3, 2016 10:11 | http://192.168.1.1/card_A_ID/ | JPEG |
| 4 | 0004.jpg | 1.8 | July 4, 2016 14:12 | http://192.168.1.1/card_A_ID/ | JPEG |

<Regarding Functionality>

FIG. 5 illustrates functionalities of the client terminal 10 and the imaging device 30 included in the imaging system 100, as an example.

<Client Terminal 10>

The client terminal 10 includes a communication unit 11, an operation receiving unit 12, a display controlling unit 13, and an HTTP communication unit 14. Such functional units are functions or units enabled by operations following Table 2 schematically illustrates a cache file stored in the cache file memory unit 19a. Cache means that when an application or browser software accesses a Web page, data of such an accessed page is stored and kept in a given folder. A cache file means a file that has been cached. There may be several types of cache files, for example, an HTML file, a script language file, a Cascading Style Sheets (CSS) file, and an image file.

The cache file of Table 2 may include several items, for example, an ID, a file name, a size, a created time and date, a URL, and a type. Table 2 is different from Table 1 in that the URL is additionally managed. The "URL" represents a URL from which the cached file is acquired. When the client terminal 10 attempts to access a certain URL and such a certain URL is the same as the "URL" in Table 2 indicating that the file has been already cached, the client terminal 10 may retrieve and display the cached file instead of accessing an access destination URL. This method eliminates the time for receiving the file, and thus shortens a user's waiting time.

<Functionality of Client Terminal 10>

The communication unit 11 of the client terminal 10 is enabled by the CPU 401 illustrated in FIG. 3 running the program 402p to control the wireless communication module 404. The communication unit 11 is configured to establish a connection for Wi-Fi (registered trademark) communication, for example. Since an SSID and a password of the imaging device 30 are provided to a user, the user sets the SSID and the password on the client terminal 10. This configuration enables a connection in accordance with a data link layer protocol (in OSI reference model) in a same manner as Ethernet (registered trademark), for example, and also enables communication between the client terminal 10 and the imaging device 30 in accordance with a communication protocol such as a TCP/IP layer protocol or an application layer protocol.

The operation receiving unit 12 is enabled by the CPU 401 illustrated in FIG. 3 running the program 402p to control the touch panel 407 or hard keys. The operation receiving unit 12 is configured to receive various operations made by a user.

The display controlling unit 13 is enabled by the CPU 401 illustrated in FIG. 3 running the program 402p, and is configured to control various screen displays on the LCD 406. For example, the display controlling unit 13 applies information transmitted from the imaging device 30 to a part constituting a screen to form a screen display. Alternatively, an HTML and a script language are interpreted in a similar manner to the browser software to create a screen display based on the CSS.

The HTTP communication unit 14 is enabled by the CPU 401 illustrated in FIG. 3 running the program 402p to communicate with the imaging device 30 in accordance with a communication protocol such as HTTP and to transmit and receive various types of information. The HTTP communication unit 14 is configured to transmit a method such as GET for specifying a URL (a file name and a CGI program), and to receive from the imaging device 30 a file of a still or moving image as a response. The HTTP communication unit 14 determines whether a URL identical to the access destination URL is stored in the cache file memory unit 19a. In a case where a URL identical to the access destination URL is stored in the cache file memory unit 19a, the HTTP communication unit 14 retrieves the file in the cache file memory unit 19a. In a case where a URL identical to the access destination URL is not stored in the cache file memory unit 19a, the HTTP communication unit 14 stores the acquired file in association with the URL in the cache file memory unit 19a. Note that a user is able to turn off such a cache function of the HTTP communication unit 14.

<Imaging Device 30>

The imaging device 30 includes a communication unit 31, an HTTP request analyzing unit 32, a file list creating unit 33, a URL creating unit 34, an HTTP transmitting unit 35, an imaging unit 36, and a file transmitting unit 37. Such functional units serve as functions or units enabled by operations following instructions from the CPU 111, in accordance with a program 112p developed on the DRAM 114 from the ROM 112 illustrated in FIG. 4. The program 112p can be downloaded from a program delivering server or can be delivered in a portable memory medium in which the program 112p is stored.

The imaging device 30 further includes a memory unit 39 enabled by the ROM 112, the SRAM 113, the DRAM 114, and a memory card 120 illustrated in FIG. 4. In the memory unit 39, a file memory unit 39b is implemented. The ROM 112, the SRAM 113, the DRAM 114, and the memory card 120 serve as memory media in the imaging device 30. Note that a URL creating method in the present embodiment is effective in the attachment and detachment of the memory card 120. Hence, in the following description, a memory medium serves as the memory card 120. In addition, the file can be stored in the ROM 112, the SRAM 113, or the DRAM 114, each serving as a memory medium.

TABLE 3

| File Name | Size [Mbyte] | Created Time and Date | Type |
|---|---|---|---|
| 0001.jpg | 1.2 | July 1, 2016 12:34 | JPEG |
| 0002.jpg | 1.5 | July 2, 2016 15:21 | JPEG |
| 0003.jpg | 2.2 | July 3, 2016 10:11 | JPEG |
| 0004.jpg | 1.8 | July 4, 2016 14:12 | JPEG |

Table 3 schematically illustrates files stored in the file memory unit 39a. The structure of the file memory unit 39a may be the same as table 1, which represents the structure of the file memory unit 19a. However, the file memory unit 39a does not include an item for ID. This is because file names given by the imaging device 30 are unique and do not overlap.

<Functionality of Imaging Device 30>

The communication unit 31 of the imaging device 30 is enabled by the CPU 111 illustrated in FIG. 4 running the program 112p to control the communication unit 117. The communication unit 31 is configured to communicate with the client terminal 10 via the Wi-Fi (registered trademark), for example. Note that the client terminal 10 may be accessed (may function as an access point), and an SSID and a password for a wireless LAN may be set on the imaging device 30.

The HTTP request analyzing unit 32 is enabled by the CPU 111 illustrated in FIG. 4 running the program 112p to perform processing in accordance with HTTP communication protocols. For example, since the number 80 is the port number for TCP, the HTTP request analyzing unit 32 is configured to determine HTTP communication and acquires an HTTP request from a TCP socket. In a case where a URL specifies a file, for example, in a GET method, the HTTP request analyzing unit 32 is configured to determine to send such a specified file. In a case where the URL specifies a server program such as a CGI, the HTTP request analyzing unit 32 is configured to run the server program. Note that the CGI is simply one example, and a programming language such as Perl (registered trademark) or JAVA (registered trademark) may be applicable.

The file list creating unit 33 is enabled by the CPU 111 illustrated in FIG. 4 running the program 112p to create a list of files stored in the file memory unit 39a. The file list creating unit 33 is enabled by running a program, such as the above-described CGI.

The URL creating unit 34 is enabled by the CPU 111 illustrated in FIG. 4 running the program 112p, and is configured to create, for example, a URL using a file name and identification information of a memory medium (e.g., the memory card 120) for each file in the list that has been created by the file list creating unit 33. The details will be described later.

The HTTP transmitting unit 35 is enabled by the CPU 111 illustrated in FIG. 4 running the program 112*p*. The HTTP transmitting unit 35 is configured to create information needed for a user to specify a file such as the URL and the file name that have been created by the URL creating unit 34, as an HTTP response, and to transmit the HTTP response to the client terminal 10 through the communication unit 31.

The file transmitting unit 37 is enabled by the CPU 111 illustrated in FIG. 4 running the program 112*p*. The file transmitting unit 37 is configured to retrieve the file specified by the URL from the file memory unit 39*a*, and to transmit the file to the client terminal 10 through the communication unit 31.

The imaging unit 36 is enabled by the CPU 111 illustrated in FIG. 4 running the program 112*p*, and the imaging control unit 105. The imaging unit 36 is configured to capture an image of a scene within an angle of view, and to create image data of a still or moving image. The imaging unit 36 is also configured to convert the still or moving image into a file in a file format, such as JPEG, and to store the converted file in the file memory unit 39*a*. At this timing, the imaging unit 36 is configured to give a unique file name that does not overlap, for example, a serially numbered file name. Note that instead of referring to the file name in the memory card 120, the imaging unit 36 is configured to keep a most recently given file name (a number), and to increment the number one by one to give a file name.

<Inconvenience in Case of Changing Memory Card>

To clarify effectiveness of the imaging system 100 in the present embodiment, an inconvenience that occurs when the client terminal 10 acquires files from two imaging devices 30 will be described.

A comparative example to the present embodiment will be described with reference to FIG. 6. FIG. 6 is a diagram illustrating URLs created by two imaging devices 30, as an example. Note that in order to distinguish between the two imaging devices 30, alphabetic codes are added to become an imaging device 30A and an imaging device 30B. Such alphabetic codes are also added to memory cards 120A and 120B to be respectively attached to the imaging devices 30A and 30B. The memory card 120A is attached to the imaging device 30A, and a file A is stored in the memory card 120A. The memory card 120B is attached to the imaging device 30B, and a file B is stored in the memory card 120B. A still or moving image in the file A and a still or moving image in the file B are different from each other, but the file A and the file B have identical file names "0001.jpg".

The imaging devices 30A and 30B, to be described in the comparative example, each create a URL based on a communication protocol, an IP address, and a file name. Therefore, the URL creating unit 34 of the imaging device 30A creates a URL "http://192.168.1.1/0001.jpg". Similarly, the URL creating unit 34 of the imaging device 30B creates a URL "http://192.168.1.1/0001.jpg".

In a case where the HTTP communication unit 14 of the client terminal 10 first communicates with the imaging device 30A and acquires the file A (0001.jpg), "http://192.168.1.1/0001.jpg" is stored in the cache file memory unit 19*a*. Due to the above, even if a user operates the client terminal 10 to attempt to acquire the file B (0001.jpg) whereby the HTTP communication unit 14 would next communicate with the imaging device 30B, the HTTP communication unit 14 is likely to retrieve the cache file in the cache file memory unit 19*a*, without transmitting an HTTP request for requesting the file B.

<Case where Identification Information of Imaging Device 30 is Included in URL>

As illustrated in FIG. 7, a case where identification information of the imaging device 30 is included in the URL will be discussed. FIG. 7 is a diagram illustrating URLs each including the identification information of the imaging device 30, as an example. In FIG. 7, each of the imaging devices 30A and 30B creates a URL using a communication protocol, an IP address, identification information of the imaging device 30, and a file name. The identification information of the imaging device 30 may serve as information for specifying the imaging device 30. In more detail, the identification information may serve as information uniquely identifying the imaging device 30. The identification information may typically include a name, a code, a character string, a numerical number, or a combination including two or more of them, for uniquely distinguishing a certain target from a plurality of targets. To be specific, a serial number, a model number and a lot number, or a MAC address may be applicable. In the present embodiment, the serial number will be described as an example.

The URL creating unit 34 of the imaging device 30A creates a URL "http://192.168.1.1/camera_A_serial_number/0001.jpg". The URL creating unit 34 of the imaging device 30B creates a URL "http://192.168.1.1/camera_B_serial_number/0001.jpg".

Although the file name of the file A in the imaging device 30A and the file name of the file B in the imaging device 30B are identical to each other, the URLs are different from each other. This configuration enables the client terminal 10 to acquire the file A from the imaging device 30A and the file B from the imaging device 30B, without using a cache file.

<Case where Identification Information of the Imaging Device 30 is Included in URL and Memory Cards are Switched>

In a case where a user detaches the memory card 120 from one imaging device 30 and attaches the memory card 120 to another imaging device 30, identical URLs will be created from different files.

FIG. 8 illustrates URLs respectively including identification information of the imaging devices 30, created in a case of the memory cards 120 being switched with each other, as an example. As illustrated in FIG. 8, a user has attached the memory card 120B to the imaging device 30A and has attached the memory card 120A to the imaging device 30B. In such a case, the URL creating unit 34 of the imaging device 30A creates a URL "http://192.168.1.1/camera_A_serial_number/0001.jpg" as a URL of the file B. The URL creating unit 34 of the imaging device 30B creates a URL "http://192.168.1.1/camera_B_serial_number/0001.jpg" as a URL of the file A.

Also in this case, the client terminal 10 is able to acquire two files without using the cache file, because the file A and the file B have different URLs from each other. However, before and after the memory cards 120A and 120B are switched, the URLs indicating the files are also switched. Hence, the following inconvenience is likely to occur.

First, it is assumed that after the client terminal 10 acquires the file A from the memory card 120A attached to the imaging device 30A, the client terminal 10 acquires the file B from the memory card 120B attached to the imaging device 30A. In this case, the URLs of the files A and B are identical "http://192.168.1.1/camera_A_serial_number/0001.jpg". Therefore, in a situation where the client terminal 10 acquires the file A from the imaging device 30A, the URL remains in the cache file memory unit 19a. In acquiring the file B, instead of requesting the imaging device 30A for the file B, the client terminal 10 is likely to retrieve the file A from the cache file memory unit 19a. In a similar manner, in a case where after the client terminal 10 has acquired the file B from the memory card 120B attached to the imaging device 30B, the client terminal 10 acquires the file A from the memory card 120A attached to the imaging device 30B, the client terminal 10 might not be able to acquire the file A.

Additionally, a case where after the client terminal 10 has acquired the file A from the memory card 120A attached to the imaging device 30A, the client terminal 10 acquires the file A from the memory card 120A attached to the imaging device 30B will be discussed. In this case, different URLs are created for the same file A, as follows.
"http://192.168.1.1/camera_A_serial_number/0001.jpg"
"http://192.168.1.1/camera_B_serial_number/0001.jpg"

In a case where a user does not intentionally switch the memory cards or the user has not remembered switching the memory cards, the user might determine that the two files are different files and unintentionally operate the client terminal 10 to acquire the file A. In such a case, the client terminal 10 would acquire the same file A from the imaging device 30B.

As described above, even in the case where the identification information of the imaging device 30 is used in the URL, in a case where the memory cards 120 are switched, an inconvenience might occur.

<Case where Identification Information of Memory Card is Included in URL>

As illustrated in FIG. 9, a case where identification information of a memory card is included in a URL will be discussed. FIG. 9 illustrates URLs each including the identification information of the memory card, as an example. In FIG. 9, each of the imaging devices 30A and 30B creates a URL including a communication protocol, an IP address, identification information of a memory card, and a file name. The identification information of the memory card serves as information for identifying the memory card. In more detail, the identification information of the memory card may be referred to as information for uniquely identifying the memory card. To be specific, the identification information of the memory card may be a memory card ID, a serial number, a model number and a lot number, or a production number. The identification information of the memory card may be any type of identification information as long as the imaging device 30 can retrieve the identification information from the memory card. In the present embodiment, an ID will be described as an example.

Hence, the URL creating unit 34 of the imaging device 30A creates a URL "http://192.168.1.1/card_A_ID/0001.jpg". The URL creating unit 34 of the imaging device 30B creates a URL "http://192.168.1.1/card_B_ID/0001.jpg".

The file A of the imaging device 30A and the file B of the imaging device 30B have identical file names, but have different URLs from each other. This configuration enables the client terminal 10 to acquire the file A from the imaging device 30A and the file B from the imaging device 30B, without using a cache file.

<Case where Identification Information of Memory Card is Used in URL and Memory Cards are Switched>

FIG. 10 illustrates URLs each including the identification information of the memory card, created in a case of the memory cards being switched, as an example. As illustrated in FIG. 10, a user has attached the memory card 120B to the imaging device 30A and has attached the memory card 120A to the imaging device 30B. In such a case, the URL creating unit 34 of the imaging device 30A creates a URL "http://192.168.1.1/card_B_ID/0001.jpg" as a URL of the file B. The URL creating unit 34 of the imaging device 30B creates a URL "http://192.168.1.1/card_A_ID/0001.jpg" as a URL of the file A.

By using the identification information of the memory card 120 in the URL, before and after the memory cards 120A and 120B are switched with each other, the respective URLs uniquely identify the files.

For example, a case where after the client terminal 10 acquires the file A from the memory card 120A attached to the imaging device 30A, the client terminal 10 acquires the file B from the memory card 120B attached to the imaging device 30A will be discussed. In such a case, a URL used for acquiring the file A is "http://192.168.1.1/card_A_ID/0001.jpg", and a URL used for acquiring the file B is "http://192.168.1.1/card_B_ID/0001.jpg". The URLs are different even in a case where the file names are identical to each other. This configuration enables the client terminal 10 to acquire the file A from the imaging device 30A and the file B from the imaging device 30B, without using a cache file.

In addition, a case where after the client terminal 10 acquires the file A from the memory card 120A attached to the imaging device 30A, the client terminal 10 acquires the file A from the memory card 120A attached to the imaging device 30B will be discussed. In such a case, a URL used for acquiring the file A from the imaging device 30A is "http://192.168.1.1/card_A_ID/0001.jpg", and a URL used for acquiring the file A from the imaging device 30B is "http://192.168.1.1/card_A_ID/0001.jpg". The identical URLs are created for the same file A. This configuration prevents a user from downloading the same file incorrectly. Additionally, since the client terminal 10 uses a cache file, downloading of the same file is prevented.

<Case where a Plurality of Memory Cards are Attached to Imaging Device 30>

A method for creating a URL in the present embodiment is advantageous also in a case where a plurality of memory cards are attachable to the imaging device 30.

FIG. 11 illustrates URLs created by the imaging device 30 to which a plurality of memory cards are attached, as an example. In FIG. 11, the memory card 120A and the memory card 120B are attached to the imaging device 30A. The file A is stored in the memory card 120A, and the file B is stored in the memory card 120B.

The imaging device 30A creates a URL using a communication protocol, an IP address, identification information of a memory card, and a file name. Therefore, the URL creating unit 34 creates a URL "http://192.168.1.1/card_A_ID/0001.jpg" for the file A, and creates a URL "http://192.168.1.1/card_B_ID/0001.jpg" for the file B.

Different URLs are created for different files. This configuration enables the client terminal 10 to acquire the files A and B, without using a cache file.

<Operation Procedure>

FIG. 12 is a sequence diagram illustrating an operation of the imaging system 100.

S1: First, the client terminal 10 and the imaging device 30 communicate with each other to establish a connection on a wireless LAN, for example. To be specific, a user presses a button arranged at the imaging device 30 for starting communication, and inputs an SSID and a password on the client terminal 10. The SSID and the password are stamped on a bottom face of the imaging device 30, in some cases.

S2: The user operates an application or browser software that runs on the client terminal 10 to display a list of files. The operation receiving unit 12 of the client terminal 10 receives an operation. Details of an operating method may differ according to the application running on the client terminal 10. However, for example, an operation of selecting a storage destination (in the client terminal 10, in the imaging device 30, or in a folder special for the application) of a still or moving image corresponds to an operation for displaying the list of files.

S3: The HTTP communication unit 14 of the client terminal 10 generates an HTTP request for the list of files, and transmits the HTTP request to the imaging device 30. Note that the IP address can be registered in the application or can be a fixed IP address to be input by the user.

S4: The communication unit 31 of the imaging device 30 receives the HTTP request, and creates the list of files. The details of this process will be described with reference to FIG. 13.

S5: The imaging device 30 that has created the list of files transmits the list of files to the client terminal 10.

S6: The communication unit 11 of the client terminal 10 receives the list of files. Hence, the display controlling unit 13 displays the list of files on the LCD 406 of the client terminal 10. An example of displaying the list of files is illustrated in FIG. 15A. The user selects a file that the user desires to retrieve from the list of files. The operation receiving unit 12 of the client terminal 10 receives the file that has been selected by the user. Details of an operating method may differ according to the application running on the client terminal 10. However, for example, the user clicks a file name or a thumbnail of a still or moving image.

S7: The HTTP communication unit 14 of the client terminal 10 generates an HTTP request for the selected file, and transmits the HTTP request to the imaging device 30.

S8: The communication unit 31 of the imaging device 30 receives the HTTP request, and performs a process for acquiring the file. The details of this process will be described with reference to FIG. 14.

S9: The communication unit 31 of the imaging device 30 transmits the file that has been selected by the user to the client terminal 10. An example of displaying the file is illustrated in FIG. 15B.

<Creation of List of Files>

FIG. 13 is a flowchart of a procedure when the imaging device 30 creates a list of files, as an example. Because a URL specifies a program name, the HTTP request analyzing unit 32 of the imaging device 30 determines that the HTTP request including a GET method requests a process to be performed by a program, and requests the file list creating unit 33 to create the list of files.

Hence, the file list creating unit 33 acquires the list of files from the file memory unit 39a (S10), and acquires information stored in the file memory unit 39a. Additionally, the file list creating unit 33 can create a thumbnail image or can retrieve the thumbnail image that has been created beforehand.

The file list creating unit 33 sets the number of files in the list of files at a variable n (S20). The variable n serves as a parameter for controlling the process.

Next, the file list creating unit 33 acquires identification information of the memory card 120, from the memory card 120 (S30). In a certain area (a predetermined unrewritable area) of the memory card, for example, a serial number is stored.

The following processes of step S40 to step S70 are repeated for the number of files. Note that "i" serves as a variable starting from 0 and incremented one by one.

The file list creating unit 33 sets information about an i-th file at "file info" that is a variable (S40). This file information corresponds to information for one file (one record) in the file memory unit 39a illustrated in Table 3.

Next, the file list creating unit 33 sets a file name of the file information at "file name" that is a variable (S50).

The URL creating unit 34 creates a URL using a communication protocol, an IP address, identification information of a memory card, and the "file name" (S60). The URL is created, for example, as follows.

URL=http://192.168.1.1/identification information of memory card/file name

Next, the HTTP transmitting unit 35 generates an HTTP response including the file name and the URL (S70). The HTTP transmitting unit 35 may transmit a thumbnail image. The file name is used by the client terminal 10 to display the file. The URL in association with the file name is stored in the client terminal 10. When the user selects a file, such a URL is used for requesting the selected file.

The imaging device 30 performs the above process for all files, and transmits the list of files to the client terminal 10 at step S5 of FIG. 12.

<Acquisition of File>

FIG. 14 is a flowchart of a procedure when the imaging device 30 acquires a file to transmit the file to the client terminal 10, as an example. Because the URL specifies a file name, the HTTP request analyzing unit 32 of the imaging device 30 determines that a HTTP request including a GET method requests a file, and requests the file list creating unit 33 to acquire the file.

The file transmitting unit 37 acquires the identification information of the memory card 120 from the URL included in the HTTP request (S110).

Next, the file transmitting unit 37 acquires the identification information from the memory card 120 attached to the imaging device 30 (S120). This process is the same as the process of step S30 in FIG. 13.

Next, the file transmitting unit 37 determines whether the identification information of the memory card 120 that has been acquired from the URL matches the identification information of the memory card 120 attached to the imaging device 30 (S130). This step is for determining whether the file specified by the client terminal 10 is stored in the memory card 120. Therefore, in a case where the determination at step S130 is No, the process of FIG. 14 ends. In this case, it is desirable that the file transmitting unit 37 transmits an error message to the client terminal 10.

In a case where the determination at step S130 is Yes, the file transmitting unit 37 acquires the file name from the URL in HTTP request (S140).

Next, the file transmitting unit 37 searches the file memory unit 39a of the imaging device 30 for the file name, and determines whether there is the specified file in the file memory unit 39a (S150).

In a case where the determination at step S150 is No, the specified file is not included in the file memory unit 39a and the process at step S14 ends. In this case, it is desirable that the file transmitting unit 37 transmits an error message to the client terminal 10.

In a case where the determination at step S150 is Yes, the file transmitting unit 37 retrieves the specified file from the file memory unit 39a, and transmits the file to the client terminal 10, as an HTTP response (S160).

<Screen Example>

FIG. 15A is a diagram illustrating the list of files, as an example. The display controlling unit 13 of the client terminal 10 displays thumbnail images 501 from the list of files included in the HTTP response. Such thumbnail images 501 allow the user to easily select a desired file. When the user selects one of the thumbnail images 501, the file is requested by the URL in association with the selected one of the thumbnail images 501.

FIG. 15B illustrates a still or moving image 502 displayed on the client terminal 10, as an example. FIG. 15B illustrates an example of the omnidirectional image, and illustrates the still or moving image 502 having a circular shape. The user is able to rotate or enlarge the image to view any portion in the image.

In addition, the user is able to store in the client terminal 10 the still or moving image 502 that the user is currently viewing. In a case of storing the image, the still or moving image 502 is stored in the file memory unit 19b and is also stored in the cache file memory unit 19a.

<Variation Example>

In the foregoing description, the URL is created using the identification information of the memory card 120. However, the URL may be created using information about the file. The information about the file means information acquirable from the file except for the file name, and can be information unique for the file. For example, the information about the file may be a time and date when the file is created. The time and date when the file is created may be identical to the time and date when the image is captured. In a case where the time and date when the file is created in the unit of minutes or seconds, the time and date is highly unlikely to be identical to the time and date of another file. Hence, even in a case where the memory cards are exchanged as follows, no inconvenience will occur.

First, the URL creating unit 34 creates the following URL from the file A (0001.jpg) of the memory card 120A attached to the imaging device 30A. It is assumed that the time and date when the file A was created is 2016.07.01.12.34.

"http://192.168.1.1/2016.07.01.12.34/0001.jpg"

In addition, the URL creating unit 34 creates the following URL from the file B (0001.jpg) of the memory card 120B attached to the imaging device 30B. It is assumed that the time and date when the file A was created is 2016.07.02.12.34.

"http://192.168.1.1/2016.07.02.12.34/0001.jpg"

Therefore, the created URLs are different from each other, and the client terminal 10 is able to acquire the files A and B, without using a cache file.

Next, a case where after the client terminal 10 acquires the file A from the memory card 120A attached to the imaging device 30A, the client terminal 10 acquires the file B from the memory card 120B attached to the imaging device 30A will be discussed. In such a case, different URLs are created for the files A and B, as follows.

File A: "http://192.168.1.1/2016.07.01.12.34/0001.jpg"
File B: "http://192.168.1.1/2016.07.02.12.34/0001.jpg"

Accordingly, although the files A and B have identical file names, the files A and B have different URLs. This configuration enables the client terminal 10 to acquire the files A and B from the imaging device 30A, without using the cache file.

Next, a case where after the client terminal 10 acquires the file A from the memory card 120A attached to the imaging device 30A, the client terminal 10 acquires the file A from the memory card 120A attached to the imaging device 30B will be discussed. In such a case, the URL used for acquiring the file A from the imaging device 30A is "http://192.168.1.1/2016.07.01.12.34/0001.jpg".

The URL used for acquiring the file A from the imaging device 30B is "http://192.168.1.1/2016.07.01.12.34/0001.jpg". Thus, as the identical URLs are created for the file A in this manner, this configuration prevents a user from downloading the file incorrectly. Additionally, since the client terminal 10 uses a cache file, downloading of the same file is prevented.

Hence, creating of a URL with information unique for a file enables prevention of a situation where the cache file is incorrectly used without acquiring the target file or where the same file is acquired again. Note that other than the time and date when the file is created, a hash value that is created from a still or moving image may be utilized.

<Conclusion>

As described heretofore, according to the imaging system 100 in one or more embodiments, by using information about a memory medium for creating a URL, the client terminal 10 is able to acquire an appropriate file. For example, by including the identification information of the imaging device 30 in the URL, the client terminal 10 is able to acquire the files having the identical file names correctly. Additionally, by including the identification information of the memory card 120 in the URL, the appropriate target file is acquired even in a case where the memory card 120 is replaced with another one. That is, the same URL is created from the same file, and different URLs are created from different files. This configuration enables prevention of using a cache file incorrectly and enables prevention of acquiring a different file.

<Other Application Examples>

Heretofore, embodiments have been described with working examples. However, the present disclosure is not limited to the above-described embodiments or working examples. Various modifications, variations and alternatives should be possible within the scope of the present disclosure.

For example, in the present embodiment, HTTP has been described as a communication protocol. However, any communication protocol that enables file transmission and reception on the TCP/IP layer is applicable. Examples may include FTP, SMB, and WebDay.

In the configuration example of FIG. 5, in order to facilitate understandings of the processes of the client terminal 10 and the imaging device 30, the client terminal 10 and the imaging device 30 are separately illustrated according to substantial functionalities. However, the present disclosure is not limited by how the processing unit is divided or what the processing unit is named. In addition, the processes of the client terminal 10 and the imaging device 30 can be divided into further detailed processing units according to the processing content. Moreover, one processing unit can be divided to include further detailed processing units.

Note that the URL creating unit 34 is one example of a specifying information creating unit. The HTTP transmitting unit 35 is one example of a transmitting unit. The HTTP communication unit 14 is one example of a file acquiring unit. The imaging unit 36 is one example of an imaging unit. The file transmitting unit 37 is one example of a file transmitting unit.

The present application is based on and claims the benefit of priority of Japanese Priority Application No. 2016-138559 filed on Jul. 13, 2016, the entire contents of which are hereby incorporated by reference.

REFERENCE SIGNS LIST 10 client terminal
30 imaging device 31 communication unit
32 HTTP request analyzing unit
33 file list creating unit
34 URL creating unit
35 HTTP transmitting unit
37 file transmitting unit
100 imaging system

The invention claimed is:

1. An information processing device communicable with a terminal via a network, the information procession device comprising:
- a memory; and
- a processor configured to execute instructions stored in the memory to:
  - create, for each file stored in a memory medium attached to the information processing device, specifying information for specifying the file stored in the memory medium, by using a file name of the file and information about the memory medium, in response to receiving a request for a list of files from the terminal via the network;
  - transmit, as the list of files, the created specifying information for each of the files to the terminal via the network;
  - receive a request for a file in the memory medium from the terminal via the network, the request for the file including the specifying information corresponding to the file, the specifying information having been transmitted from the information processing device to the terminal; and
  - transmit, in response to receiving the request from the terminal, the file corresponding to the request to the terminal,
- wherein the memory medium serves as a memory card that is attachable to and detachable from the information processing device, and the information about the memory medium includes identification information of the memory card.

2. The information processing device according to claim 1, wherein the information about the memory medium includes information for identifying the information processing device to which the memory medium is attached.

3. The information processing device according to claim 1, wherein the information about the memory medium includes information for identifying the memory medium.

4. The information processing device according to claim 1, wherein the information about the memory medium includes information about the file stored in the memory medium.

5. The information processing device according to claim 4, wherein the information about the file includes a time and date when the file is created.

6. An imaging device comprising:
- the information processing device of claim 1; and
- an imaging unit configured to capture an image within a given range,
- wherein image data captured by the imaging unit is stored in the file.

7. A system comprising:
- a terminal; and
- an information processing device communicable with the terminal via a network, the information processing device being configured to transmit a file stored in a memory medium attached to the information processing device to the terminal,
- wherein the information processing device includes:
  - a specifying information creating unit configured to create, for each file stored in the memory medium, specifying information for specifying the file stored in the memory medium, by using a file name of the file and information about the memory medium, in response to receiving a request for a list of files from the terminal via the network;
  - a transmitting unit configured to transmit, as the list of files, the created specifying information for each of the files to the terminal via the network; and
  - a file transmitting unit configured to transmit, in response to receiving a request for a file in the memory medium from, the terminal via the network, the file corresponding to the request, the request for the file including the specifying information corresponding to the file,
- wherein the terminal includes a file acquiring unit configured to specify one of the files in accordance with the specifying information that has been transmitted from the information processing device, and to acquire the one of the files from the information processing device,
- wherein the memory medium serves as a memory card that is attachable to and detachable from the information processing device, and the information about the memory medium includes identification information of the memory card.

8. An information processing device communicable with a terminal via a network, the information processing device comprising:
- a specifying information creating unit configured to create, for each file stored in a memory medium attached to the information processing device, specifying information for specifying the file stored in the memory medium, by using a file name of the file and information about the memory medium, in response to receiving a request for a list of files from the terminal via the network;
- a transmitting unit configured to transmit, as the list of files, the created specifying information for each of the files to the terminal via the network; and
- a file transmitting unit configured, in response to receiving a request for a file in the memory medium from the terminal via the network, the request for the file including the specifying information corresponding to the file, to transmit the file corresponding to the request to the terminal,
- wherein the memory medium serves as a memory card that is attachable to and detachable from the information processing device, and the information about the memory medium includes identification information of the memory card.

* * * * *